United States Patent [19]

Singer et al.

[11] Patent Number: 4,734,287

[45] Date of Patent: Mar. 29, 1988

[54] PROTEIN PRODUCT BASE

[75] Inventors: Norman S. Singer; Shoji Yamamoto; Joseph Latella, all of London, Canada

[73] Assignee: John LaBatt Limited, London, Canada

[21] Appl. No.: 606,959

[22] Filed: May 4, 1984

[51] Int. Cl.⁴ .............. A23J 1/20; A23D 5/00
[52] U.S. Cl. .................... 426/41; 426/548; 426/602; 426/605; 426/657; 530/362
[58] Field of Search ............ 426/583, 548, 589, 657, 426/605, 41, 602; 260/122; 530/362

[56] References Cited

U.S. PATENT DOCUMENTS

| | | |
|---|---|---|
| 2,377,624 | 6/1945 | Gordon . |
| 2,566,477 | 9/1951 | Abrahamczik et al. . |
| 2,602,746 | 7/1952 | Meade . |
| 2,710,808 | 6/1955 | Peebles et al. . |
| 3,066,133 | 11/1962 | Pinckney . |
| 3,300,318 | 1/1967 | Szczesniak et al. .......... 426/605 |
| 3,397,997 | 8/1968 | Japikse . |
| 3,507,663 | 4/1970 | Starook et al. . |
| 3,552,981 | 1/1971 | Luksas . |
| 3,594,192 | 7/1971 | Mullen et al. . |
| 3,615,661 | 10/1971 | Ellinger et al. . |
| 3,620,757 | 11/1971 | Ellinger et al. . |
| 3,632,350 | 1/1972 | Battista . |
| 3,642,490 | 2/1972 | Hawley et al. . |
| 3,642,492 | 2/1972 | Arndt . |
| 3,642,493 | 2/1972 | Arndt . |
| 3,644,326 | 2/1972 | Pign ........................ 260/122 |
| 3,689,288 | 9/1922 | Duren . |
| 3,708,307 | 1/1973 | Lundstadt . |
| 3,723,407 | 3/1973 | Miller et al. . |
| 3,726,690 | 4/1973 | Schuppner et al. . |
| 3,737,326 | 6/1973 | Basso et al. . |
| 3,757,005 | 9/1973 | Kautz et al. . |
| 3,793,464 | 2/1974 | Rusch . |
| 3,798,339 | 3/1974 | Peng . |
| 3,800,052 | 3/1974 | Inagami et al. . |
| 3,829,592 | 8/1974 | Bratland . |
| 3,842,062 | 10/1974 | Eastman . |
| 3,843,828 | 10/1974 | Arndt . |
| 3,852,503 | 12/1974 | Magnino et al. . |
| 3,853,839 | 12/1974 | Magnino et al. . |
| 3,865,956 | 2/1975 | Fukushima et al. . |
| 3,865,956 | 2/1975 | Fukushima et al. . |
| 3,870,811 | 3/1975 | Schulz ........................ 426/348 |
| 3,873,751 | 3/1975 | Arndt . |
| 3,891,777 | 6/1975 | Boyer . |
| 3,891,778 | 6/1975 | Boyer . |
| 3,892,873 | 7/1975 | Kolen et al. ................ 426/602 |
| 3,892,873 | 7/1975 | Kolen et al. . |
| 3,899,605 | 8/1975 | Schaap . |
| 3,914,435 | 10/1975 | Maubois et al. . |
| 3,922,375 | 11/1975 | Dalan et al. . |
| 3,929,892 | 12/1975 | Hynes et al. . |
| 3,930,039 | 12/1975 | Kuiper . |
| 3,930,056 | 12/1975 | Feminella et al. . |
| 3,935,323 | 1/1976 | Feminella et al. . |
| 3,969,534 | 7/1976 | Pavey et al. . |
| 3,978,243 | 8/1976 | Pedersen . |
| 3,982,039 | 9/1976 | Scibelli et al. . |
| 4,007,283 | 2/1977 | Crisan et al. . |
| 4,018,752 | 4/1977 | Buhler et al. . |
| 4,029,825 | 6/1977 | Chang . |

(List continued on next page.)

FOREIGN PATENT DOCUMENTS

| | | |
|---|---|---|
| 1313085 | 4/1973 | European Pat. Off. . |
| 076549 | 4/1983 | European Pat. Off. ......... 426/583 |
| 1363783 | 8/1974 | United Kingdom . |
| 2063273 | 6/1981 | United Kingdom ........... 426/657 |
| 0129364 | 12/1984 | United Kingdom . |

*Primary Examiner*—Robert Yoncoskie
*Attorney, Agent, or Firm*—Fisher, Christen & Sabol

[57] ABSTRACT

There is disclosed a proteinaceous, water-dispersible, macrocolloid comprising substantially non-aggregated particles of dairy whey protein. The particles have a mean diameter particle size distributions in a dried state, ranging from about 0.1 microns to about 2.0 microns, with less than about 2 percent of the total number of particles exceeding 3.0 microns in diameter. The majority of the said particles are substantially spheroidal when viewed at about 800 power magnification under a standard light microscope. The colloid has a substantially smooth, emulsion-like organoleptic character when hydrated. There is also disclosed a process for preparing the above described product.

54 Claims, 20 Drawing Figures

U.S. PATENT DOCUMENTS

| | | |
|---|---|---|
| 4,031,261 | 6/1977 | Durst . |
| 4,031,267 | 6/1977 | Berry et al. . |
| 4,057,655 | 11/1977 | Okada et al. . |
| 4,058,510 | 11/1977 | Concilio-Nolan et al. . |
| 4,072,670 | 2/1978 | Goodnight, Jr. et al. . |
| 4,079,154 | 3/1978 | Yasumatsu . |
| 4,089,987 | 5/1978 | Chang et al. . |
| 4,091,116 | 5/1978 | Edwards et al. . |
| 4,103,037 | 7/1978 | Bodor et al. . |
| 4,103,038 | 7/1978 | Roberts . |
| 4,104,413 | 8/1978 | Wynn et al. . |
| 4,107,334 | 8/1978 | Jolly . |
| 4,113,716 | 9/1978 | Gomi et al. . |
| 4,125,630 | 11/1978 | Orthoefer . |
| 4,137,339 | 1/1979 | Kudo et al. . |
| 4,140,808 | 2/1979 | Jonson . |
| 4,143,174 | 3/1979 | Shah et al. . |
| 4,147,810 | 4/1979 | Kellor . |
| 4,169,160 | 9/1979 | Wingerd et al. . |
| 4,183,970 | 1/1980 | May et al. . |
| 4,186,218 | 1/1980 | Gomi et al. . |
| 4,188,411 | 2/1980 | Kuipers et al. ............ 426/582 |
| 4,192,901 | 3/1980 | Yasumatsu et al. . |
| 4,194,018 | 3/1980 | Hodel et al. . |
| 4,194,019 | 3/1980 | Yasumatsu et al. . |
| 4,205,094 | 5/1980 | Baird et al. . |
| 4,209,503 | 6/1980 | Shah et al. . |
| 4,212,893 | 7/1980 | Takahata . |
| 4,217,370 | 8/1980 | Rawlings et al. . |
| 4,218,490 | 8/1980 | Phillips et al. . |
| 4,230,738 | 10/1980 | Shemer et al. . |
| 4,234,620 | 11/1980 | Howard et al. . |
| 4,244,983 | 1/1981 | Baker . |
| 4,247,566 | 1/1981 | Inagami et al. . |
| 4,248,895 | 2/1981 | Stroz et al. . |
| 4,251,562 | 2/1981 | LeGrand et al. . |
| 4,252,835 | 2/1981 | Maerker et al. ............ 426/589 |
| 4,259,361 | 3/1981 | Procter . |
| 4,260,636 | 4/1981 | Yasumatsu et al. . |
| 4,265,924 | 5/1981 | Buhler et al. ............ 426/657 X |
| 4,267,100 | 5/1981 | Chang et al. . |
| 4,271,201 | 6/1981 | Stenne . |
| 4,275,084 | 6/1981 | Ohyabu et al. . |
| 4,278,597 | 7/1981 | Cho et al. . |
| 4,279,939 | 7/1981 | Cho . |
| 4,291,067 | 9/1981 | Buhler et al. . |
| 4,293,571 | 10/1981 | Olofsson et al. . |
| 4,305,964 | 12/1981 | Moran et al. . |
| 4,305,970 | 12/1981 | Moran et al. . |
| 4,307,118 | 12/1981 | Kajs . |
| 4,325,937 | 4/1982 | Remer . |
| 4,325,977 | 4/1982 | Remer . |
| 4,333,958 | 6/1982 | Egnell ............ 426/583 |
| 4,340,612 | 7/1982 | Askman et al. . |
| 4,352,832 | 10/1982 | Wood et al. ............ 426/589 |
| 4,362,761 | 12/1982 | Chang et al. . |
| 4,376,133 | 3/1983 | Farnand ............ 426/656 |
| 4,379,175 | 4/1983 | Baker . |
| 4,486,345 | 12/1984 | Callewaert . |
| 4,497,836 | 2/1985 | Maquardt et al. . |
| 4,500,454 | 2/1985 | Chang . |
| 4,515,825 | 5/1985 | Moran et al. ............ 426/603 |

EQUIVALENT VOLUME ($\mu^3$)

EQUIVALENT DIAMETER ($\mu$)

PROTEIN PRODUCT BASE

The present invention relates to food and, in particular, food products derived from dairy whey protein.

BACKGROUND OF INVENTION

Milk proteins can be divided into two general classes, namely, the serum or whey proteins and the curd or casein products. Casein is generally classified as a phosphoprotein but in reality is a heterogeneous complex of several distinct and identifiable proteins (alpha, beta, kappa, et cetera, proteins), phospherous and calcium which complex takes the form of a colloidal calcium salt aggregate in milk called calcium caseinate. During the production of cheese, casein is precipitated from the milk by one of two methods. The first involves the treatment of the milk with acid to lower the pH to about 4.7 whereupon the casein proteins precipitate from the milk to form the curd which will ultimately be processed to cheese. In the alternative process, the precipitation of the casein is accomplished using a rennet enzyme rather than acid. The casein produced by the former process is generally higher in fat and lower in ash than the corresponding product derived from the latter process. The difference in the ash content is believed to be a result of calcium phosphate being split off of the casein molecules by the action of the acid, with the residual ash being mostly organically bound phospherous. The "acid casein" is used in the production of soft cheeses such as cottage cheese, while the "rennet casein" or "para-casein" is utilized in the manufacture of cheeses such as cheddar or mozzarella.

Whey is the serum remaining after the solids (fat and casein) are removed from the milk. Whey comprises lactalbumin and lactoglobulin proteins. Lactalbumin makes up 2% to 5% of the total skim milk protein and is believed to function in milk as a proteinaceous surfactant stabilizer of the fat particles. Lactoglobulin makes up another 7% to 12% of the total skim milk protein and is closely associated with the casein protein in whole milk. Whey derived from the acid precipitation process mentioned above is referred to as acid or sour whey and generally has a pH of about 4.3 to 4.6. Whey derived from the enzymatic precipitation process, also mentioned above, is referred to as sweet whey and generally has a pH of from about 5.9 to about 6.5. As a generalization, commercial dried whey comprises about 10% to 13% denatured protein, 71% lactose, about 2% lactic acid, about 3% to 5% water, about 8% to 11% ash, and includes a low concentration of phosphoric anhydride. As derived from the cheese making process, whey generally is an aqueous medium comprising 90% or more water. The respective characteristics of sweet and acid wheys are summarized below:

|  | Sweet | Acid |
| --- | --- | --- |
| Lactose | 4.0 to 5.0% | 4.0 to 5.0% |
| Dry Solids | 5.3 to 6.6% | 5.3 to 6.0% |
| Proteins | 0.6 to 0.8% | 0.6 to 0.7% |
| Minerals & Salts* | 0.4 to 0.6% | 0.7 to 0.8% |
| Fats | 0.2 to 0.4% | 0.05 to 0.1% |

*Primarily $Na^+$, $K^+$ and $Ca^{++}$ salts
It is noted that U.S. Pat. No. 4,358,464 discloses a proposal for converting acid whey to sweet whey.

The volume of whey produced is directly proportional to the volume of cheese production. One estimate for the United States alone, placed whey production on the order of 43.6 billion pounds per year.

Although both whey itself and whey components such as the whey proteins lactalbumin and lactoglobulin and the sugar lactose all have various known utilities, there are significant difficulties in converting the whey into industrially useful forms. The fundamental difficulty is that whey as obtained from the cheese making process contains, as mentioned above, about 90% water and none of the components are generally useful in that form. The removal of the excess water is very expensive and is most likely to remain so in view of present and projected energy costs. Moreover, the useful proteins contained in whey make up only a minor proportion, some 9% to 11% by weight, of the whey solids. The major portion of the balance of the whey solids, ie. greater than 70% by weight thereof, is lactose. The commercial value of lactose was and is, however, quite low. The end result was that whey was generally considered by the cheese maker to have little value and indeed, as merely an item to be disposed of at the least possible cost. Quite often the whey was merely dumped, by draining to sewer. In more recent times, however, increased awareness of the possible pollution of the environment has resulted in the imposition of severe restrictions on such disposal methods to the extent where whey became almost a liability in the context of the cheese making process. Although some local authorities will accept whey and its related products for treatment in their sewage systems, their charge for doing so is very high. One of the alternatives which then became feasible in order to reduce the costs associated with whey disposal, was to heat the by-product so as to heat denature and coaggulate the protein, principally lactalbumin, which could then be separated in a coarse, non-functional form from the residual lactose syrup. The resulting products were then sold to defer the processing costs to below the disposal costs. More preferably the whey was then simply dried using spray, drum or freeze drying and the like, to produce a hygroscopic product. Typical of the products produced by such means are dried whey animal feed supplements comprising a minimum of 65% lactose and about 12% protein. These supplements have higher concentrations of riboflavin than does skim milk and the supplements are generally valued in feed mixtures as a source of this and other solubles (see *Encyclopedia of Chemical Technology*, Vol. 6, page 308).

If these latter processes are controlled, recrystallization of the lactose can be effected and a more useful non-hygroscopic product is obtainable. Crystaline precipitation of lactose can also be utilized to slightly enhance the protein content of these products. Such procedures further offset the processing costs by producing a slightly more valuable product. However, the dried products retain, to a significant extent, the characteristic whey odour and especially taste, which limit their commercial utility. Such products generally have very little value-added relative to whey and are used mostly as additives in the baking industry because of the water absorption capacity of the denatured proteins.

As a consequence of the severe disposal problems besetting the industry and the possibility of realizing a significant economic return over and above processing costs through the sale of concentrated or upgraded whey protein and other whey censtituents, there has been much expenditure of time and money in whey treatment research and development in recent years.

Most of these efforts have dealt with isolating or concentrating the protein. One process for recovering whey proteins is known in the art as the "centri-whey" process and comprises denaturing the native whey proteins by heat treatment at a pH of from 4.5 to 4.6 and subsequently isolating the denatured proteins by centrifugation. Only about 70% of the whey proteins are denatured using this process and the balance is lost to the supernatent following contrifugation. This inefficiency notwithstanding and assuming the functional attributes of native whey proteins are not required in a given application, denatured whey proteins are preferred, in part because they are, according to U.K. specification No. 2,020,667, more readily digested than are the native undenatured proteins. Denaturation, in the context of protein chemistry, covers a range of changes in the molecular structuring of proteins that may be induced, for example, by heating a protein solution beyond the point which is characteristic for each protein and/or by exposing it to acids, alkalies or various detergents. An irreversibly denatured protein has a reduced solubility relative to its undenatured or native state as well it cannot be crystalized. The denaturation process involves the rupture of inter-molecular hydrogen bonds such that the highly ordered structure of the native protein is replaced by a more random structure. While denaturation is usually irreversible, there are some instances, depending on the protein being treated and the treatment to which the protein is subjected, which are reversible. Some of the differences between the properties of native and denatured whey proteins have been reported in the relevant literature. Reference will be made herein to such differences between the native and denatured whey proteins as bear on their respective utilities. At some point towards the end of the denaturation process, changes occur which are directly perceivable by unaided human senses which generally involve gelling, thickening and the development of opacity. This stage of the process is hereinafter refered to as coagulation.

Other processes for concentrating whey proteins utilize ultra-filtration techniques. For example, one known method in volves subjecting whole whey to an ultra-filtration step whereby a lactose syrup and a soluble, undenatured whey protein concentrate (WPC) is obtained. The WPC is disclosed as being both soluble at low pH and therefore useful in high nutrition beverages, and coagulable by heat to produce an egg white replacer. To the best of the present inventors' knowledge, the WPC resulting from this process has never been used commercially in the latter capacity, presumably because current economics appear to favour natural egg whites in most applications. In any case, the solubility and coagulability of this WPC are derived from the functional characteristics retained by the undenatured whey proteins. It is noted once again, however, that in applications, where those functionally derived characteristics are not specifically required, denatured whey proteins are reported to be more easily digested and, moreover, impart characteristics such as water adsorption or colour and heat stability attributes desirable in certain applications, which attributes are not available from undenatured whey proteins.

As another example of ultrafiltration is whey processing, U.K. specification No. 2,020,667 teaches a process wherein whey proteins are recovered from whole whey by subjecting the whole whey to a heat treatment to denature and insolubilize the proteins which are then recovered from the liquid medium by ultra-filtration. This process is disclosed as being more cost-effective and more yield-efficient than the above-mentioned "centri-whey" process in that the undenatured whey proteins (30%) are retained together with the denatured proteins in the ultra-filtered retentate rather than being lost to the centrifuged supernatent.

U.S. Pat. No. 3,896,241 describes another process for producing a soluble whey protein concentrate having a low microbial count in which whey from bovine milk is passed through a diatomaceous earth filter to remove residual casein and milk fat; and subsequently subjected to an ultra-filtration step which removes the major part of the water, lactose and mineral salts leaving a whey protein concentrate. This concentrate is then passed through a strongly acidic cationic exchange resin to further reduce the mineral salt level in the product and reduce the pH, the latter being reduced further if desired by the addition of acid. This concentrate is then dried in the normal manner such as by spray drying.

U.S. Pat. No. 4,235,937 discloses a process for treating a variety of protein sources by utilizing a technique other than ultra-filtration with particular emphasis being placed on the treatment of whey. An important feature of that treatment is that the whey, which is whole whey having the usual low total solids and high lactose content, must be fresh or nearly fresh. Moreover, from the time of its production in the cheesemaking process to its being processed according to the disclosed process, its temperature must not be allowed to drop to any significant extent. In fact, the minimum temperature at which the whey must be maintained prior to processing is disclosed as being 90 degrees Fairenheit. The process involves subjecting the whey to "blending shear forces" in the presence of a metal gluconate solution which functions as a blandness imparting agent and a colloid enhancer component, the reaction mixture during the blending being maintained at an elevated temperature but one which is below the denaturing temperatures of the proteins present. The above agents are also said to assist in effecting the important automatic decanting feature of the process. The process disclosed in this patent is intended to avoid denaturation of the whey protein and any protein that is denatured and contained in the automatically decanting floc is by definition of a large particle size.

U.S. Pat. No. 3,852,506 discloses a process for making dry, agglomerated, soluble whey protein which is relatively bland and readily reconstituted into a liquid form, the process comprising mechanically dividing spray dried, demineralized, spheres of whey protein isolate to a particle size less than forty-four (44) microns, which particles are then agglomerated obviously to larger sized particles. It should be noted that spray-drying of whey, in common with the other usual methods of drying whey usually produces a dried product having a particle size of from about 75 microns to 200 microns and usually toward the upper end of that range. The inventors, although unaware of the precise mechanism by which the process achieves the desired objectives, believe that it is the specific mechanical manner of forming the subdivided particles, namely grinding, which provides the desired result, namely a relatively bland product. The particle size characteristic is apparently required to assist in dispersing the dried product in liquid to accelerate solubilization therein. U.S. Pat. No. 4,225,629 describes another process for the production of an insoluble protein concentrate which, in this case, also contains carbohydrates such as starch, vitamins and a relatively high percentage of fat. In this process a mixture of whey and a protein—containing seed product is adjusted to a pH of about 9–10; the resulting juice, which contains soluble proteins, is separated therefrom and acidified to an acid pH, following which the protein is precipitated by heat or by the addition of sodium hexametaphosphate, and the precipitate separated, washed with water and dried by known methods such as drum-drying or freeze-drying. In contrast to preparing simple protein concentrates, U.S. Pat. No. 4,218,490 discloses a process for preparing an edible foodstuff incorporating a proteinaceous surface-active agent. The surface-active agent contains more than ninety (90) percent of protein and is a functional protein obtainable from a large variety of protein sources including soya, blood, whey and oil seeds by ion-exchange extraction followed by drying. The use of soluble whey lactalbumins in this application appears to be similar to the role these same proteins play in the stabilization of fat particles in milk. As is usual with such agents, it is used in relatively small amounts based on the amount of food involved. Indeed, this agent is generally used as a minor component of the total amount of such functional agents used in any particular application.

All of the foregoing processes which result in insoluble denatured protein products involve, for the most part, heat denaturing the whey at about, or above, the whey's isoelectric point. According to Modler et al, *Journal of Dairy Science,* Volume 60, No. 2, such processes are both popular and economical in the recovery of whey proteins but the resulting products are generally insoluble and gritty, and the scope of their commercial application is limited accordingly. Improvements in solubility have been reported by Amantea et al in the *Journal of Canadian Institute of Food Science and Technology* 7:199, 1974 in whey proteins which were iron-fortified then treated under alkaline conditions: but these improvements are realized only through extensive depletion of sulphur-containing amino acids. Processes carried out below the isoelectric point of the whey protein in question are reported by Modler at el to generally result in improved solubility and functionality. A similar process is described in U.S. Pat. No. 3,930,039 wherein it is expressly disclosed that only a very small fraction of the total whey protein is denatured under highly acid/elevated temperature conditions which leaves the balance of the protein in its native functional and hence, soluble condition.

Obviously, soluble native whey protein does not contribute a gritty texture to foods fortified with same nor does it contribute an emulsion-like texture. Moreover, difficulties have been encountered in utilizing such soluble whey protein in fortification of pasta, as is disclosed in *Food Processing,* 36, (10) 52, 54 (1975). According to this article, USDA scientists at the Eastern Regional Research Centre in Philadelphia found that conventional native (soluble) whey protein products were unacceptable for use in fortification of pastas without extensive and radical alterations to the processing equipment used in the manufacture of unfortified pastas. Heat denatured whey protein products do not require such modifications to the existing pasta-making equipment. Product evaluation of such denatured whey protein fortified pasta by a trained taste panel established that the denatured whey protein fortified pasta had an inferior texture to unfortified pasta. This finding is not surprising in view of the expected gritty character of heat denatured whey proteins. While the taste panel found that the difference in texture would not render the fortified products commercially unacceptable, particularly as tomato and cheese sauces further mask the differences, it is clear on the face of it that the fortified product would be more commercially acceptable if the texture could be inherently improved upon rather than simply masked. However, as pointed out by Modler et al, supra, the large particle size of the protein agglomerates formed by the above-mentioned whey protein denaturing processes result in products having a gritty mouth feel. This operates to restrict the product's commercial utility even as a protein supplement.

Similar organoleptic problems have been encountered in the use of soya bean derived protein in calorie reduced foods, as is disclosed in U.S. Pat. No. 4,041,187. That patent points out that the use of mechanical size-reducing apparatus has been generally unsuccessful in obtaining the desired results. A similar situation has been encountered in respect of whey protein as is reflected in an article appearing in the *New Zealand Journal of Dairy Science and Technology,* 15, 167–176, by J. L. Short. The data disclosed in Table 2 of that article demonstrates that most of the traditional techniques utilized in the manufacture of the heat-precipitated (denatured) whey protein isolate results in protein particle sizes ranging from about 100 to about 200 microns, even after grinding or other mechanical particle size reducing treatments. Even the relatively smaller denatured whey protein particles (about 28 microns) disclosed by Short contribute a coarse, gritty texture to foods so supplemented.

It is noteable that undenatured "spherical" whey protein particles having a mean particle size of about 28 microns can be obtained by spray drying the whey protein concentrate. Even though such particle sizes are of the same order of magnitude as fat particles in milk (1 micron to 22 microns, with a 5 millimicron membrane believed to comprise a protein phospholipid and high melting point triglyceride complex) the rheological properties of the respective whey and fat particles is significantly different with the result that when fully hydrated and dispersed the proteins, being mostly undenatured, resolubilize and lose their particulate identity, creating somewhat viscous, sticky solutions typical of soluble proteins which, of course, cannot approximate the mount feel associated with the fat particles.

In addition to the clear advantages of utilizing low calorie substitutes for fats and oils in calorie reduced foods, there are shelf-life considerations which could make stable fat substitutes highly desirable. This is particularly true in foods such as salad dressings and mayonnaise products. As stated in the *Encyclopedia of Chemical Technology,* Volume 12, page 38, "in no other fatty food product is oil subjected to so many unfavourable conditions which tend to turn it rancid or to cause it to deteriorate in other ways. Time, temperature, light, air, exposed surface, moisture, nitrogenous organic material, and traces of metals are known to be factors responsible for rancidity. In salad dressings and mayonnaise products, the oil is subjected similtaneously to most or all of these adverse conditions."

To be widely acceptable, any replacement for such fats and oils in emulsified food products should closely approximate the organoleptic characteristics of the oil or fat to be replaced. Principal amongst those characteristics are the attributes of mouth feel and clearly a gritty product will be entirely unacceptable in such an application.

In contradistinction to the previously mentioned documents which are concerned with the protein component of whey, U.S. Pat. No. 4,143,174 and its divisional application Ser. No. 965,270, now U.S. Pat. No. 4,209,503, teach using vegetable as well as dairy wheys as sources of a non-protein colloidal precipitate which is useful as a functional food modifier capable of modifying food compositions into which they are incorporated, and in particular, the stabilization, emulsification, thickening, clouding, gelling and viscous properties of such compositions. The precipitate is non-proteinaceous in nature, although a small proportion of protein, up to five percent (5%) of the complex, may be present, this essentially being considered as a contaminant which is non-deleterious to the present precipitate, apart from having a nominal dilution effect. The precipitate has a particle size of less than 10 microns and more particularly, in the range of about 1 millimicron to about 1 micron. Preferably, it is obtained from the non-protein ultra-filtration fraction of whey and the whey, or the non-protein fraction thereof, is concentrated up to about 30% solids. The precipitate may be obtained by raising the pH of the whey or fraction thereof to between a pH of between 5 and 9, usually between about 5.8 and 7.2, and then heating until the desired precipitate is formed. It may be dried by any conventional means but generally at temperatures at less than one hundred and eighty (180) degrees Fahrenheit, since above that temperature "browning" may occur. The precipitate will comprise from as little as 0.01 percent to as much as 30% but generally from 0.5 percent to about 20-25% of the food composition in which it is incorporated. Being non-proteinaceous in nature, however, these precipitates are not useful in increasing the foods' PER (Protein Efficiency Ratio) value. Generally, protein fortification of foods has been carried out using fish, soy, whey, casein, egg albumin or gluten protein sources. Each of these fortifying agents has its attendant problems. Soy protein, for example, develops a typical off-flavour over time, even if it is very carefully prepared. Fish proteins all have objectional off-flavours. Egg albumins, in order to be stabilized in a commercially-practical dry form, require enzymatic treatments which unfortunately also produce a fishy off-flavour. Gluten proteins can be used but these have a low PER. Whey has already been mentioned hereinbefore and the problems attendant its use are clearly set out above. As a consequence of the problems associated with protein fortification using such agents other than whey, the use of such other agents has been restricted to very low levels or to use in products wherein their objectionable character can be masked. They are not considered to be useful in bland, or subtly flavoured, food products.

In summary, soluble food protein is generally gluey, while thermally denatured proteins tend either to manifest as massive gels (such as cooked egg whites, for example) or as coarse, gritty particles. One notable exception to this generalization arises in the case of soy proteins which have been successfully spun into fibres having organoleptic properties (texture, specifically) that are reminiscent of myofibrilar substances, such as meats. That texture is obviously not universally applicable, however, since such fibres clearly do not emmulate in any respect the mouth feel one might expect to experience, for example, with fats or oils.

It remains only to be noted that, according to The Whey Products Institute as quoted in *The FDA Consumer*—November 1983, only 53% of the 43.6 billion pounds of whey produced annually in the United States is currently being processed into useful whey products.

It is an object of the present invention to provide a new and useful form of whey proteins and a process for the production thereof.

GENERAL STATEMENT OF INVENTION

It has now been found, and this finding forms the basis of the present invention, that whey proteins can be converted into a novel physical form, which when hydrated surprisingly exhibits certain desirable organoleptic properties normally attributable to fat/water emulsions. In accordance therefore with one aspect of the present invention, there is provided a proteinaceous, water-dispersible, colloid comprising substantially non-aggregated particles of sweet whey protein coagulate having mean diameter particle size distributions, when dried, ranging from greater than about 0.1 microns to less than about 2.0 microns, with less than about 2 percent of the total number of particles exceeding 3.0 microns in diameter, and wherein the majority of the said particles appear to be spheroidal when viewed at about 800 power magnification under a standard light microscope, whereby the colloid has a substantially smooth, emulsion-like organoleptic character when hydrated.

In respect of the use of the term "mouth feel" herein, it will be appreciated that such relates generally to a group of feeling sensations which, while common to the body as a whole, are particularly acute in the bucal and esophageal mucosal membranes. More precisely, the term "mouth feel" as used herein is in reference to one of the above-mentioned group of sensations and in particular, to that sensation associated with the tactile perception of fineness, coarseness, greasiness, et cetera. This tactile impression is generally appreciated in the mouth proper wherein subtle differences between various foods are most readily perceived.

Thus the novel whey proteins of the present invention, when dispersed in an aqueous medium, exhibit a mouth feel most aptly described as emulsion-like. Obviously, the degree of hydration of the protein effects its rheological properties, and hence the manner in which the proteins are perceived in the mouth. The mouth feel of these proteins desirably and most closely approximates that associated with fat/water emulsions when the proteins are hydrated.

The pseudo-emulsion character of the novel whey proteins of the present invention is manifest in gravitationally stable macrocolloidal dispersions of the novel heat denatured coagulated whey protein particles, which range in size from about 0.1 to about 2.0 microns in diameter. Such dispersions approximate the visual and organoleptic impressions normally associated with oil-in-water emulsions such as (by ascending order of the concentration of the novel whey protein in some corresponding products obtainable through the practice of the present invention) coffee-whiteners, pourable salad dressings, spoonable salad dressings, spreads or icings.

It will be appreciated that the term "solution" is often used in the whey protein art as a synonym for what is in fact a true colloidal dispersion of undenatured whey proteins. Such undenatured whey protein particles having sizes of about 0.01 microns to 0.001 microns, the stability of colloidal dispersions of these are dependant upon the net electrical charges on the protein molecules and, particularly at pH's near the isoelectric point thereof (about pH 5.2), on the affinity of these whey proteins for water molecules. Thus, such undenatured whey proteins properly fall within the ambit of the smaller ranges of particles studied in colloid chemistry, as defined in the *Condensed Chemical Dictionary*, 9th Edition, Page 222. In contradistinction thereto, the denatured whey protein particles of the present invention range in size from about 0.1 to about 2.0 microns, and hence include particles nearer and above the upper limit of the size range set out in the above-mentioned definition. Notwithstanding the heat denaturation of the novel whey proteins of the present invention, however, the colloidal character thereof: ie. the stability of dispersions of such particles in an aqueous medium, is not lost. Accordingly, novel whey protein dispersions within the context of the present invention resist protein sedimentation from neutralized aqueous suspensions at forces as high as 10,000 gravities (at a pH about 6.5 to 7.0). Hence the term "macro-colloidal dispersions" is used herein for the purpose of distinguishing between "solutions" of undenatured whey proteins (ie. "true colloid dispersions") and those based on the novel whey proteins of the present invention (hereinafter "macro-colloidal dispersions"). Similarly, the denatured coagulated whey proteins of the present invention is hereinafter referred to as a macrocolloid to be distinguished from a true colloid which pursuant to the above-cited dictionary definition means a substance wherein the particle sizes are not greater than 1 micron. This distinction reflects the increased size of some of the particles of the denatured coagulated whey protein of the present invention.

It has also been found that dispersions of larger, denatured whey protein coagulates (ie. greater than 2 microns when dried) impart an undesirable chalky mouth feel to foods so supplemented. This chalkiness can be identified as being a less coarse variant of the gritty mouth feel of known heat denatured whey proteins (about 15-175 microns). It appears that a sharply defined perceptual threshold is crossed as the number of particles of whey protein coagulate larger than 2 microns increases.

Particle sizes in the range of less than 0.1 microns down to a size where the particles are not preceived at all, contribute a greasy taste which is objectionable if it is perceived as the dominant tactile characteristics. It is because the perceived transition between an emulsion-like mouth feel and a greasy mouth feel appears to be much more gradual than is the transition between the former and the chalky mouth feel, that greater proportions of particles of less than 0.1 microns in diameter are acceptable in macro-colloids of the present invention. Thus, provided that the mean particle size is not less than 0.1 microns, the emulsion-like character is dominant, not withstanding that the distribution itself may include a substantial proportion of individual particles having diameters smaller than 0.1 microns.

The novel products of the present invention are obtainable by subjecting undenatured whey protein and especially concentrates thereof to a high shear treatment in an aqueous medium at a highly acid pH and elevated temperature, advantageously but optionally in the presence of aggregate blocking agents. This process may be carried out on aqueous suspensions of the whey proteins alone or in an admixture including various other components, examples of which are detailed elsewhere herein.

Accordingly, therefore, there is also provided, as another aspect of the present invention, a process comprising heat denaturing undenatured dairy whey proteins at a pH in the range of pH's which form the lower half of the of the isoelectric curve thereof to very high shear conditions, sufficient to prevent the formation of larger fused proteinaceous aggregates.

INTRODUCTION TO THE DRAWINGS

During the course of the more detailed description of the invention and the examples which follow hereinafter, reference will be made to the appended drawings of which:

FIG. 1 is a longitudinal section through a fluid processing device which is the subject of Applicant's co-pending application U.S. Ser. No. 606,978, herein incorporated by reference, is particularly well suited for uniformly providing the high shear force and high heat transfer rates preferred in the practice of the present invention;

Figure 3A:
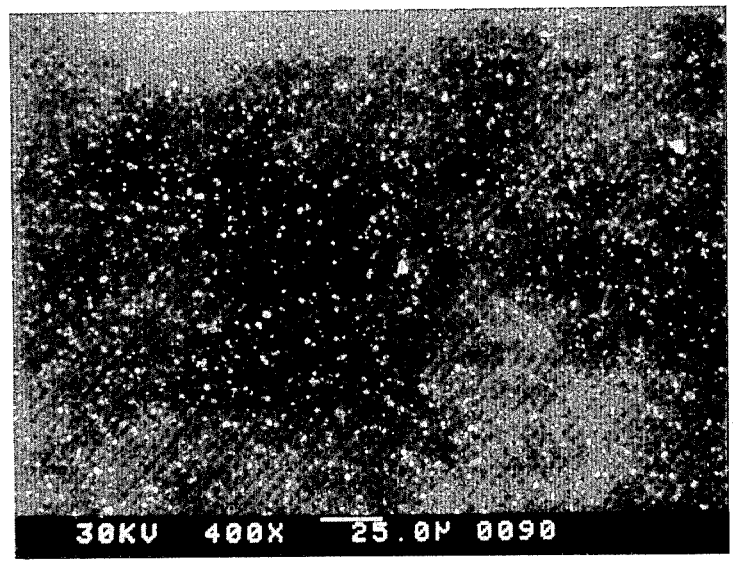
Figure 3B:
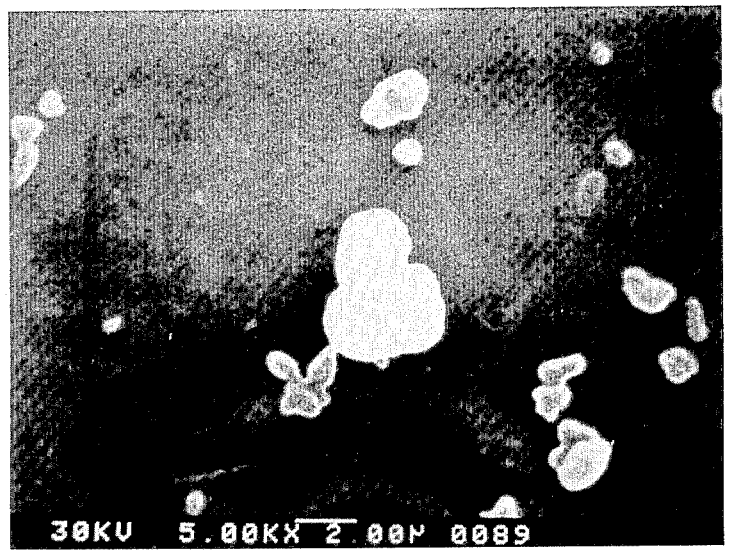
Figure 4A:
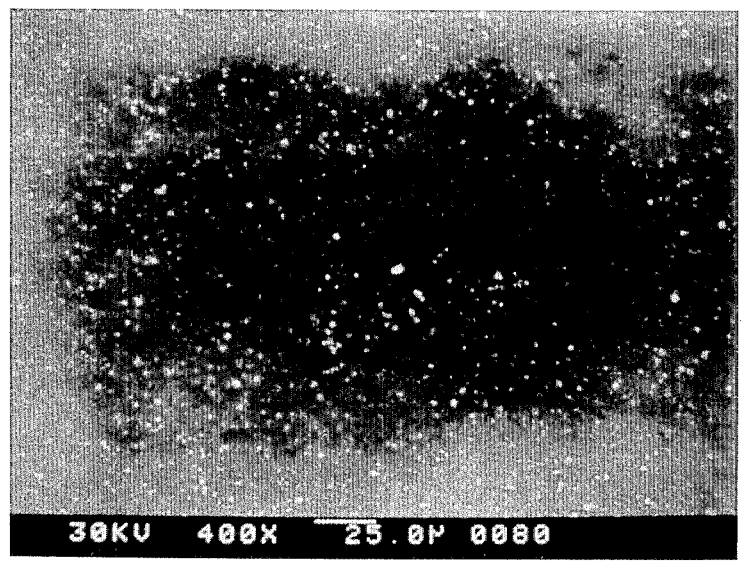
Figure 4B:
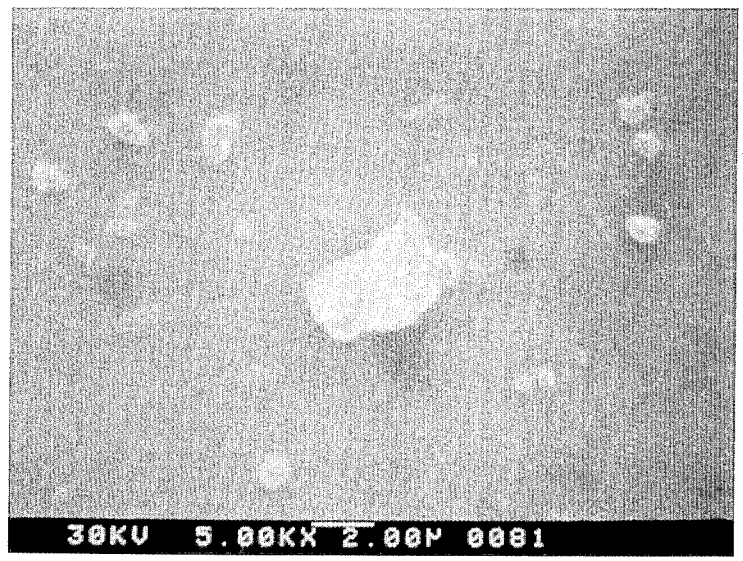
Figure 5A:
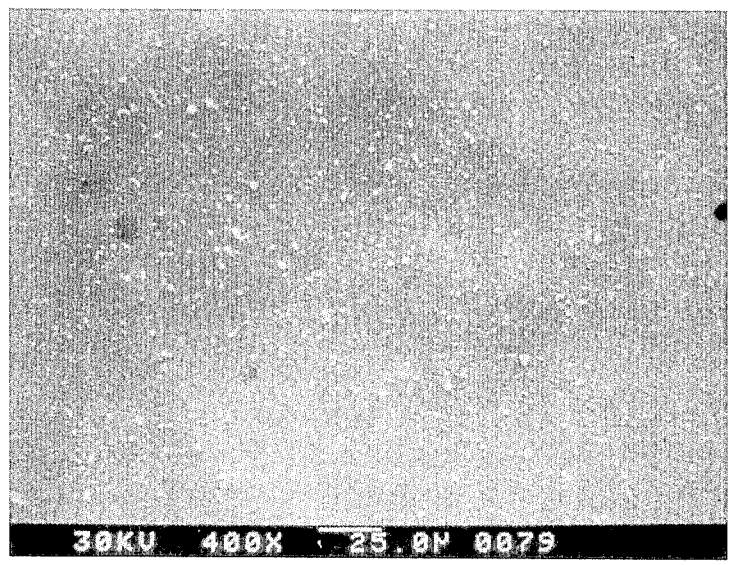
Figure 5B:
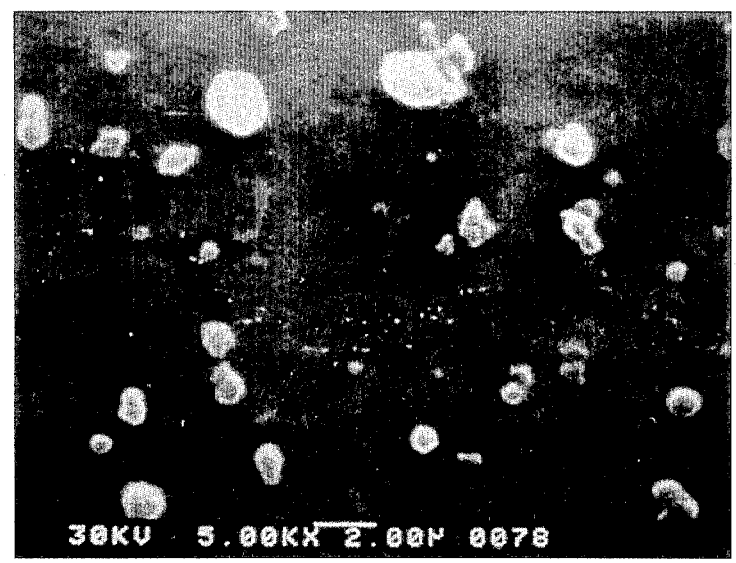

FIGS. 3, 4 and 5 are photomicrographic views of a sample of macrocolloids within the scope of the present invention. FIGS. 3a, 4a and 5a depict the macrocolloids at 400× magnification. FIGS. 3b, 4b and 5b depict portions of the fields shown in FIGS. 3a, 4a and 5a, respectively, and at 5000× magnification.

Figure 6A:
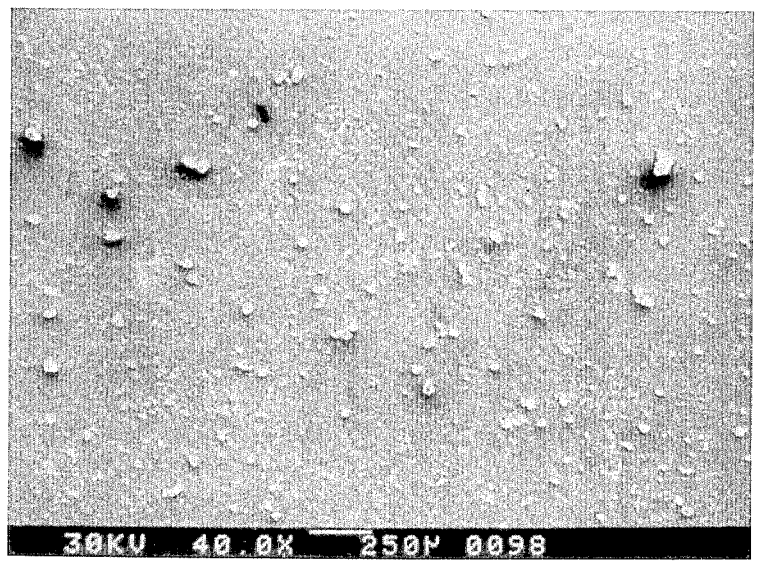
Figure 6B:
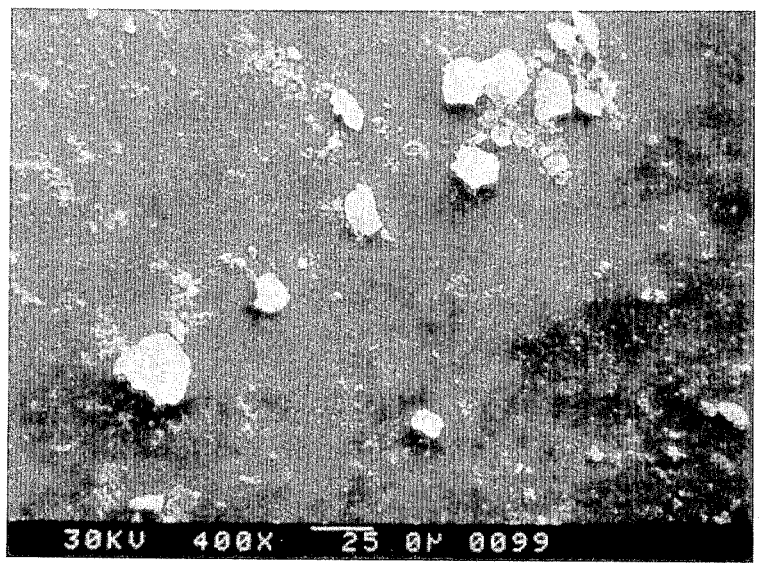

FIGS. 6a and 6b are photomicrographic views of ALATAL ®810 whey protein at 40× and 400× magnification, respectively. ALATAL ®810 whey protein is a commercial whey product available from New Zealand Milk Products, Inc., Rosemont, Ill., U.S.A.

Figure 7A:
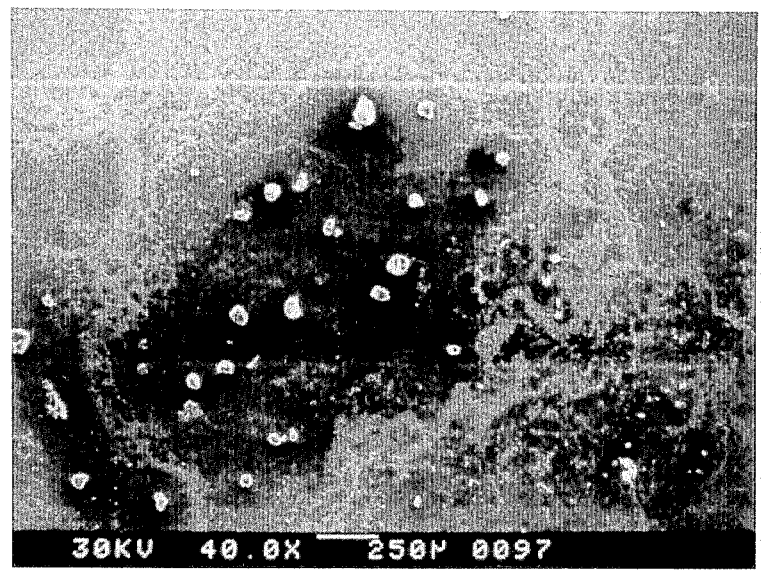
Figure 7B:
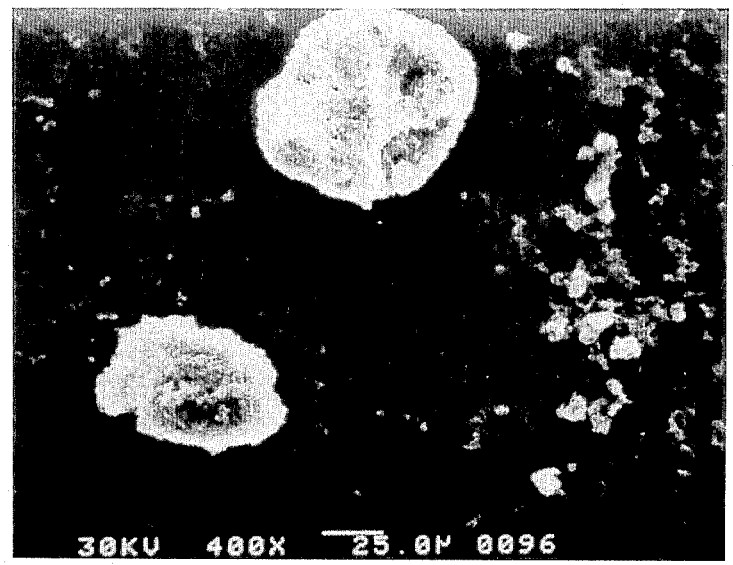

FIGS. 7a and 7b are photomicrographic views of ALATAL ®812 whey protein at 40× and 400× magnification, respectively. ALATAL ®812 whey protein is a commercial product similar to ALATAL ®810 whey protein, and is also available from New Zealand Milk Products, Inc. (NOTE: A more detailed disclosure of the above ALATAL ® products is set forth in Example 5.)

Figure 8A:
Figure 8B:
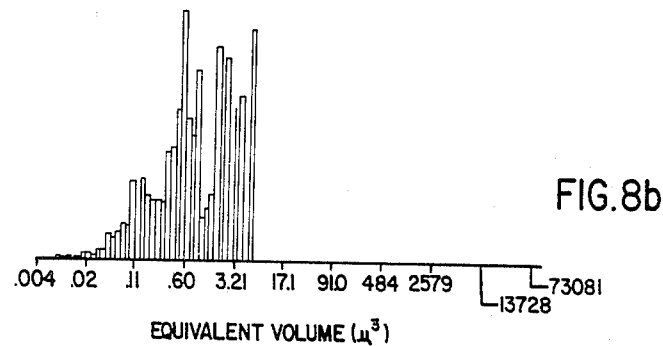

FIGS. 8a and 8b are comparable semi-logrithmic histograms representing particle size distrubtions in terms of equivalent volume representative samples of ALATAL ®810 whey protein and macrocolloids of the present invention.

Figure 9A:
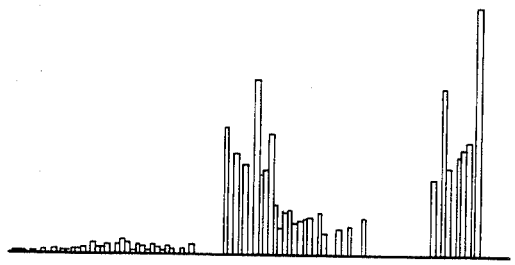
Figure 9B:
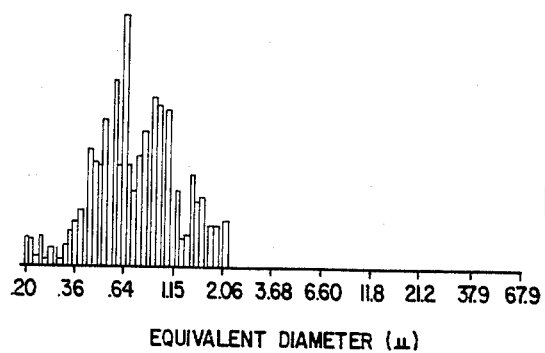

FIGS. 9a and 9b are comparable semi-logrithmic histograms representing particle size distributions in terms of equivalent diameters of representative samples of ALATAL ®810 whey protein and macrocolloids of the present invention, respectively.

Figure 10A:
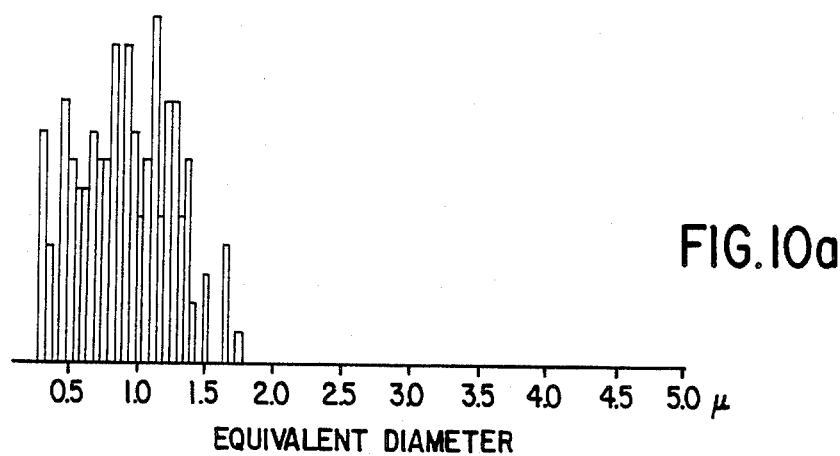
Figure 10B:
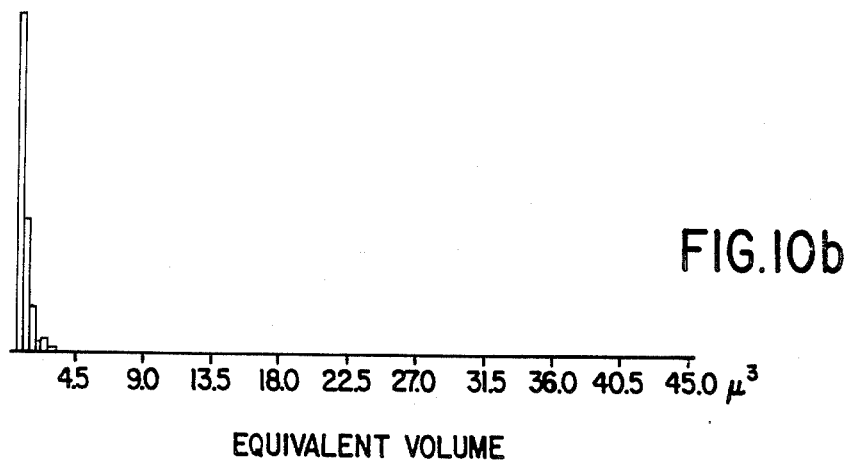

FIGS. 10a and 10b are histograms having linear, as distinguished from logrithmic base lines, and representing the particle size distribution in terms of equivalent diameter and equivalent volume, respectively, of a preferred macrocolloid sample of the present invention.

DETAILED STATEMENT OF INVENTION

Heat denaturation of whey proteins in acid media has surprisingly been found to involve what is believed to be a discrete two stage transition between the native whey proteins (particle size about 17 angstroms) and the large (15–175 microns) heat denatured aggregated whey protein particles known in the art. It has now been found that an intermediate form of the whey protein can manifest as non-aggregated particles ranging in size from approximately 0.1 to 2.0 microns, from which particles certain of the advantages of the present invention flow.

Native whey proteins, when exposed to suitably elevated temperatures under denaturing conditions are believed to initially undergo tertiary and secondary conformational degradation whereby the original shape of the protein is lost and at least some of the co-valent disulfide linkages are cleaved to form individual sulphydryl groups. Thus the proteins are believed to uncoil into a somewhat random configuration. As the denaturation of a protein proceeds further, the individual proteins take up new confirmations, which may involve the formations of new secondary through quaternary structures (ie. the sulfhydryl groups mentioned above may interact to establish new disulfide bridges, and divalent cations may interact with charged regions on the protein molecules on both the inter- and intra-molecular levels) such that the intermediate form and finally the insoluble, aggregated, large particle, denatured proteins are in turn produced. Regardless of whether or not this hypothesis is borne out, however, the advantages of the present invention are to be achieved in accordance with the practice as set out in the instant disclosure.

As has alredy been mentioned, there is provided in accordance with one aspect of the present invention, a proteinaceous macro-colloid comprising substantially non-aggregated particles of heat denatured whey protein coagulate having particle size distributions with mean diameters, when dried, ranging from greater than about 0.1 microns to less than 2.0 microns, wherein less than about 2 percent of the total number of said particles exceeds 3.0 microns in diameter and also where in the majority of the particles appear to be spherical when viewed at about 800 power magnification under a standard light microscope. The macro-colloid has a substantially smooth, emulsion-like organoleptic character when hydrated.

In another aspect of the present invention, there is provided a coagulate similar to that described above but wherein substantially all of the total combined mass of said particles is made up of particles having volumes, when dried, from about $5 \times 10^{-4}$ cubic microns to about 5.5 cubic microns.

These above mentioned coagulates of the present invention are particularly advantageous in that they:

(1) are denatured and therefore readily digestible, but at the same time retain a high PER since the sulphur containing amino acids are not lost in processing;
(2) form gravitationally stable macro-colloidial dispersions;
(3) are non-gritty and are therefore highly desirable as protein supplements in human foods; and,
(4) have an emulsion-like organoleptic character approximating that associated with oily and fatty foods, and are therefore useful as high protein, low calorie "fat replacers" in such applications.

It will be appreciated, therefore, that the present invention also includes food protein supplements and high protein-low calorie "fat replacers" comprising the above mentioned macro-colloids. In addition the present invention relates generally to foods which include as ingredients, or indeed are based on, the said macro-colloids.

A process by which the novel whey proteins may be produced is essentially a controlled or extent-limited heat denaturation process during hich very high shear is utilized to prevent the formation of any significant amounts of large particle size whey protein aggregates. It will be appreciated that in the event that the macro-colloids of the present invention are, following their formation, subject to additional denaturing heat treatments, the particles will form fused aggregates and hence loose their advantageous properties. To this extent these macro-colloids should be considered to be heat labile and treated accordingly.

In accordance therefore, with another aspect of the present invention there is provided a process for heat denaturing undenatured dairy whey proteins at a temperature of between about 80 degrees Centigrade and 130 degrees Centrigrade, and at a pH of between about 3.5 and 5.0, and under very high shear conditions which are selected such that the formation of protein aggregates of larger than about 2.0 microns, when dried, is substantially avoided, the said process to be carried on for a time sufficient to produce a substantial number of macro-colloidial particles ranging in size from about 0.1 to 2.0 microns, when dried. Such particle size determinations as are necessary may be readily made by a man skilled in the art using, for example, "oversize particle" tests described hereinafter.

Clearly, while oversized particles, and particularly those protein aggregates in excess of 2.0 microns, can be removed by, for example, filtration using nitro-cellulose membrane filters, from the valuable macro-colloids of the present invention, it is clearly advantageous to avoid both the presence of those particles in the starting materials, and the formation of same during the denaturation process.

In addition to substantially avoiding the formation of such particles the preferred processes of the present invention offer other advantages as set forth below.

PREFERRED EMBODIMENTS

Selection of the Raw Materials

The present invention relates generally to the conversion of dairy whey, and more particularly to the conversion of the protein components thereof, into useful products. The derivation of dairy whey, and the differences between sweet and acid wheys has already been disclosed herein. It remains only to be noted: firstly that the diary wheys should not have undergone any significant microbiological or other spoilage; and, secondly, that the use of sweet whey results in a product which is very much superior to those obtainable when acid whey is used.

As a generalization, any or all of the following; an unusually high acidity, (i.e. an unusually low pH) a high ash content, or the presence of large insoluble aggregated particles in a diary whey and or a diary whey protein concentrate are indicative of one or more of:

(1) poor handling and storage of the whey;
(2) microbiological spoilage;
(3) attempts to restore pH through the use of buffers or basic salts so as to mask the effects of (1) or (2) and to thereby give the appearance of restoring the product to its original specifications; or (4) if pre-pasteurized, excessive heat treatment during that pasteurization.

For the present purposes, none of these attributes are desirable (ie. the whey proteins should be in a substantially undenatured form) and a preferred dairy whey starting material should have none of these characteristics. Clearly any deficiencies in the original whey will be carried through processing and manifest deleteriously in the final product.

Preferred sweet whey protein concentrates meet the following specifications:

pH 6-7
ash (% dry basis) less than 5
total lipids (% dry basis) 2 to 4
total nitrogen (% dry basis) 8 to 8.5
NPN (% dry basis) less than 0.75
true protein (% dry basis) 48 +/−1
insoluble protein (% dry basis) 5 or less
denatured protein (% dry basis) 3 or less wherein:
(1) true protein is calculated as the product of the difference between the per cent total nitrogen and the per cent nonprotein nitrogen (both on a dry basis) times 6.38;
(2) insoluble protein is given as a percentage by weight of the total protein and is defined as that protein which is separated from a 1% neutralized dispersion of the whey protein concentrate following 20 minutes centrifugation under 17,000 gravities; and
(3) denatured protein is expressed as a percentage by weight of the total protein and is calculated on the basis of DSC analysis (differential scaning calorimetry—also well known as differential thermal analysis, DTA).

Notwithstanding that the above specified WPC could be spray-dried to a moisture content of, for example, about 3% moisture, it will be understood that WPC which has never been dried is preferable, to dried whey protein concentrates. Thus the preferred WPC is one which is derived from fresh, undried, liquid dairy whey, and which is not itself dried prior to use according to the present invention. Such preferred WPC is hereinafter referred to as "native whey protein concentrate".

Whey Pre-Processing: Pasteurization

A pasteurization treatment is optional since the realization of the macro-colloid product of the present invention is not necessarily contingent on pasteurization. As a practical matter however, pasteurization will be useful and preferable in most commercial instances in order to avoid disadvantageous microbial spoilage.

The conditions which may be utilized herein to treat the diary whey are typical of the pasteurization times and temperatures useful in processing other materials, such as milk for example. Thus a batch process, for example, might require a temperature of about 60 degrees Centigrade for 30 minutes. Similarly the widely known continuous and high temperature short residence time pasteurization processes (about 71 degrees Centigrade for 15 seconds) is also applicable for the purposes of the present invention. The high temperature short residence time pasteurization process is preferred however, since the conditions prevailing in such processing have less effect on the flavour of the final product and the process is continuous.

The only constraint on pasteurization conditions is that any significant protein denaturation should be avoided so as to avoid the concomitant formation of any significant number of denatured protein aggregates larger than 3 microns.

Whey Pre-Processing: Ultrafiltration; Lactose Reduction; Water Removal

Ultrafiltration is the preferred means for concentrating the whey proteins in the diary whey to between about 35 to 55% by weight of the total solids contained in the retentate. Other suitable means will be evident to a man skilled in the relevant arts in light of the present disclosure. In any case when subjected to the process of the present invention whey protein concentrates having 35% or less protein tend (by virtue of the relatively high concentration of milk sugars present) to undergo Maillard reactions, which results in undesirable changes in the flavour, texture, taste and nutritional value of the whey proteins, while whey protein concentrate solutions having greater than 55% protein produce progressively poorer product yields, in terms of cost effectiveness, as the protein concentration increases. The relative increase in protein on a dried basis is actually accomplished mainly as a result of a reduction in the amount of lactose (on a dry basis) in the ultrafiltered retentate solids. It goes without saying therefore that the molecular weight cutoff of the selected ultrafilter must be intermediate the respective molecular weights of the undenatured whey protein and the disaccharide lactose. This function can be met by using, for example, very fine porosity ultrafilters having molecular weight cutoffs on the order of 1,000 daltons. Such hard ultrafilters trap low molecular weight peptides (LMP) and non-protein nitrogenous molecules (NPN) in the retentate. The retention of the LMP and NPN in the ultrafiltered retentate has been advocated in the prior art on the basis that these materials promote what has been called "useful whipping properties". This may be a consideration in assessing which ultrafilter to use in the general practice of the present invention.

These same LMP and NPN molecules, however, have now been associated with the "typical whey flavour" and are considered to be undesirable from the standpoint that if the whey protein macro-colloids are to be utilized in a particularly bland food product wherein the offending flavour cannot be masked, their presence may lower the quality and therefore the marketability of the product. As a generalization, the LMP and NPN molecules can be considered to have molecular weights in the range of 10,000 to 18,000 daltons. Thus if an ultrafilter is selected in the range of about 20,000 to 30,000 daltons, not only are the LMP and NPN molecules passed into the permeate, but the overall flux rate is significantly higher than is possible with the same surface area of a harder ultrafilter. Ultrafilters having molecular weight cutoffs in excess of 30,000 daltons are not as desirable in that the large pores of the ultrafilter tend to become quickly clogged with the desired whey proteins.

Avoiding LMP and NPN in the retentate in accordance with the practise of one embodiment of the present invention however is particularly preferred in instances where drying of the present macro-colloids is contemplated. In the dried form of the product, these molecules "glue" the macro-colloid particles together and make rehydration of the macrocolloid to form an evenly dispersed suspension difficult in the extreme.

Another aspect of the creation of the creamy or emulsion-like character of the product is the elimination of the fine grittiness which is occasionally encountered and which is due to the formation of excessive amounts of spiculate lactose crystals in the final product. The lactose present in the retentate following ultrafiltration can be further reduced by using a commercial preparation of fungal lactase in tandem with the ultrafiltration treatment. The use of fungal lactase for lactose hydrolysis in milk products is disclosed, for example, in U.S. Pat. No. 2,826,502 and U.S. Pat. No. 4,179,335.

The amount of water in the original dairy whey is reduced in the retentate by way of the ultrafiltration treatment. While not essential to the practise of the present invention, this reduction means less water has to be carried through the balance of the processing steps, which of course renders these stages more economical. Moreover, many of the products contemplated herein utilize high macrocolloid solids concentrations in order to approximate the best product consistency. While high solids concentrations for such applications can be achieved at any subsequent stage of the process, or even after completion thereof, the advantages attendant water reduction clearly favour doing so prior to the denaturation process. Ultrafiltration as previously described, however, is not economically useful for increasing the total solids per se in the retentate beyond 16% (about 50% to 55% protein, by weight of the total solids). Moreover, ultrafiltration simultaneously increases the percentage protein on a total solids basis at the same time as the total solids concentration is being increased, which is stipulated above results in progressively poorer product yields, in terms of cost effectiveness, as the percentage protein concentration on a total solids basis increase beyond 55%. Accordingly, the total solids in the retentate may be increased in the final whey protein concentrate by vacuum distillation of the retentate to drive off the desired amount of water. Conversely, the retentate may be freeze-dried for example, and then rehydrated to yield the desired solids concentration in the resulting whey protein concentrate. About 40% to 50% solids is preferred in most cases since dilution of such a concentrate with the other ingredients that are required to produce finished consumer products can be used to bring the concentration of the macrocolloids to the levels required therein. The desired macrocolloid concentration will depend on the nature of the product itself.

The by-product of the ultrafiltration treatment is the permeate, which contains mainly water, lactose, calcium phosphate, lactic acid and other material, and when the ultrafilter is appropriately selected, LMP and NPN. Conceivably, this permeate would be a suitable starting material for the purpose described in U.S. Pat. No. 4,143,174 and No. 4,209,503. Alternatively, the lactose and nitrogenous materials could be sold as products in and of themselves. LMP/NPN and calcium phosphate fractions can be produced using low temperature lactose crystal lization followed by subsequent heat processing for example. The LMP/NPN concentrate is in effect a concentrated foaming agent provided of course that it is recovered in an undenatured form. Lactose can be readily utilized in any one of the conventionally marketable forms for such a product, or utilized as a source of fermentable carbohydrates in the production of ethanol or other such product.

Whey Pre-Processing: Deaeration of the Whey Protein Concentrate

Uniformity of denaturation, and hence optimization of yield and product quality in the practise of the present invention can be enhanced by even heating of the product during the denaturation of the whey proteins. Since air bubbles are a barrier to uniform heating of the whey protein concentrate in the denaturation of the whey proteins, such entrapped air can adversely affect product quality. Hence, and this is particularly applicable in the high temperature short residence denaturation treatments disclosed hereinafter, air bubbles are preferably purged from the whey protein concentrate prior to such processing there of. In the event that the air remains entrained in the whey protein concentrate during processing, heat transfer efficiency is severely reduced resulting in:

(1) reduced conversion efficiency; and/or
(2) less uniform products as a consequence of locally impaired heat conduction and hence, less uniform heating.

The dearation is readily accomplished using, for example, the commercially available Versator TM apparatus, sold by Cornell Machine Company.

Processing: Protein Denaturation

The conversion of undenatured dairy whey proteins to the macrocolloids of the present invention is accomplished by treating solutions of the undenatured whey proteins to protein denaturing conditions (at pH's in the range of from 3.5 to 5.0) and temperatures of between about 80 degrees Centigrade to 130 degrees Centigrade (under very high shear forces).

The pH is preferably between about 3.5 to 4.5, and even more preferably, in the range of between 3.7 and 4.2. All adjustments of the pH in the process of the present invention are carried out using food grade acids such as, for example, hydrochloric and citric.

The selected denaturation temperature and the rate of heat transferred to the product in any given heating apparatus will determine to a large degree the time in which the optimum amount of the macrocolloids are formed. The timing therefor is best determined in each circumstance using the "oversize" particle tests described hereinafter.

The selected temperature is preferably greater than 80 degrees Centigrade (about 15 minutes is sufficient when utilizing specialized heating equipment, such as that employed with the Waring blender mentioned hereinbelow, at 80 degrees Centigrade treatment temperature). Processing times at denaturation temperatures of between 90 degrees Centigrade and 95 degrees Centigrade are about five minutes. At 120 degrees Centigrade on the other hand, the processing time was much shorter, about three seconds. Clearly, such high processing temperatures are complemented by rapid rates of heat transfer (ie. those producing a temperature rise (TC/sec) in the whey protein concentrate of about 40, assuming that the initial temperature of the whey protein solution is about 5 degrees Centigrade). Where the nature of the processing equipment permits, therefore, processing at high heat transfer rates/high denaturation temperatures for very short times is preferred. It should also be noted that at temperatures higher than 120 degrees Centigrade, say about 130 degrees Centigrade, with correspondingly reduced product residence times, the resulting macrocolloid product is "thinner" and therefore less desirable. Such processing conditions as mentioned above are available using the fluid treatment device described hereinafter and illustrated in FIGS. 1 and 2.

Preferred shear conditions in the whey protein solution are best determined by using "oversize" particle testing to establish the most economical conditions under which the particular blending apparatus in use operates, while similtaneously avoiding the formation of any substantial amounts of aggregated, denatured protein particles larger than about 2 microns. For a one gallon waring blender drive equipped with a miniaturized (eg. 1 liter capacity) "Henschel" mixer, for example, 5000 rpm. was found to provide sufficient shear for this purpose. In accordance with the preferred processing conditions, however, the whey protein solution is subjected to high temperatures for a very short time at very high (about 450,000 to 600,000 and usually about 500,000 reciprocal minutes) shear. Apparatus suitable for use in establishing the preferred process conditions is described below.

The preferred fluid food substrate processor useful in the practice of the present invention basically comprises:
a tube including an outer surface and an inner cylindrical surface having a central longitudinal axis;
means on said outer surface to carry a heat exchange medium;
an elongated cylindrical rotator rotatable about said axis, said rotator being located within said tube and oriented coaxially with said inner surface whereby there is provided a treatment zone consisting of a substantially uniform unobstructed annular space of not more than about 2 mm between said rotator and said inner surface;
means to rotate said rotator at high speed; and
means external of said treatment zone, adapted to fill said treatment zone with a fluid to be treated and thereafter to maintain said zone in a filled condition and at sufficiently elevated pressure relative to ambient atmospheric pressure to prevent the formation of a vapour phase within said zone which might otherwise result as a consequence of outgassing of components contained in said fluid food at elevated treatment temperatures while providing for the through-put of said fluid food during the processing thereof in said treatment zone.

It will be appreciated that the present device provides for extremely rapid treatment of the substrate and assists passage of whey protein concentrate material therethrough, It is preferred that the inner surface of the tube and/or an outer surface of the rotator be coated with, or consist of, a relatively inert polymeric material such as a halogenated polyethylene, eg. polytetrafluoroethylene or chlorotrifluoroethylene polymer.

Generally a pump system is used to supply material to the treatment zone.

When it is contemplated that any given processor of the present invention will be used to treat fluid substrates under temperature conditions which, at ambient pressures would permit a vapour phase to form within the treat zone, the provision must be made to prevent such out-gassing. Usually, such a supply pump is located upstream of the treatment zone and means, such as a valve, are provided downstream of the treatment zone whereby the pressure within said zone may be controlled. In a preferred arrangement, a first pump located upstream of the treatment zone supplies whey proteins in solution from a source thereof to said zone and a second pump, located downstream from the treatment zone and operating at a lower rate than the first pump, establishes a back pressure in the treatment zone. Regardless of whether a pump or some other means is used to create this back pressure, the back pressure is generally essential in order to avoid out-gassing in the treatment zone of volatile substrates from the solution.

The formation of a vapour phase in the treatment zone defeats the purpose of the design features intended to promote uniformity of processing conditions within the zone by creating an unstable, often transient and usually only local insulating barrier to the efficient, uniform transfer of heat to the whey proteins contained in the solution. For this reason it is also preferred that the solutions to be treated in the processor of the present invention be deaerated prior to processing. As has already been mentioned, this can be readily accomplished by way of commercially available deaerating apparatus, eg. the VERSATOR TM deaerator sold by the Cornell Machine Company.

The two pump system mentioned above permits a balanced control over both throughput and back pressure. The first, or up-stream, supply pump 86 is adjustable to set the rate of product throughput through the treatment zone. The operation of the second or downstream pump 100 is then adjustable to control the back pressure generated within the apparatus (including the treatment zone) intermediate the two pumps.

The need to avoid the generation of a vapour phase in the treatment zone is very important when treating a food product as in the present invention. Loss of volatile components from a food product generally compromises the organoleptic quality of the food although, as will be appreciated by those skilled in the art, the controlled rectification of some undesirable volatile components may actually enhance certain food products. It is possible to control or even avoid loss of volatile components from the whey protein solutions by cooling the substrate following completion of the treatment thereof to a temperature below that at which unwanted volatilization or separation occurs at ambient atmospheric pressures prior to decreasing the back pressure to ambient. This is perhaps most readily accomplished by providing a heat exchange device intermediate the treatment zone and the second pump. Other considerations bearing on the temperature at which the product exits the second pump (or other means suitable for establishing the appropriate back pressure) may include, for example, whether or not direct aseptic packaging of the treated product is desired or whether product is to be passed to storage. In any case, the formation of a vapour phase must be substantially avoided within the treatment zone.

The amount of back pressure is, of course, contingent on the nature of the whey protein solution being treated (ie. the presence or absence of volatile flavour additives) and the treatment conditions being used for that purpose. The necessary pressures consistent with avoiding out-gassing in the treatment zone is easily calculated and will be readily apparent to a man skilled in the art.

Figure 1:
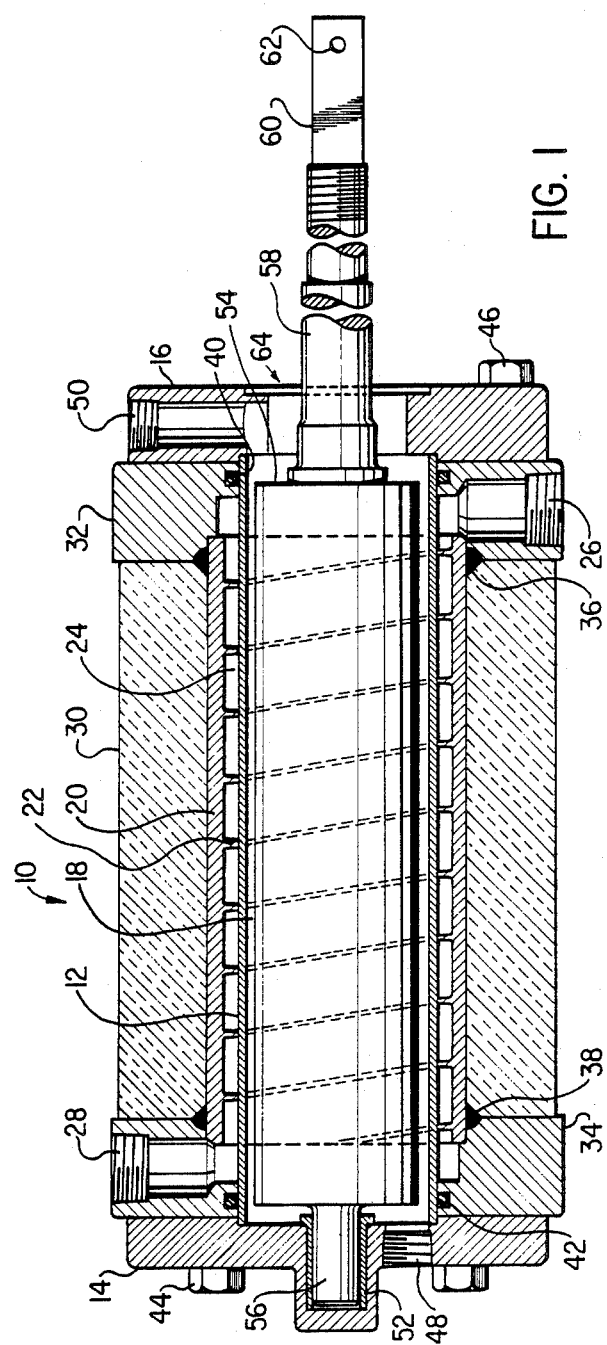
Figure 1A:
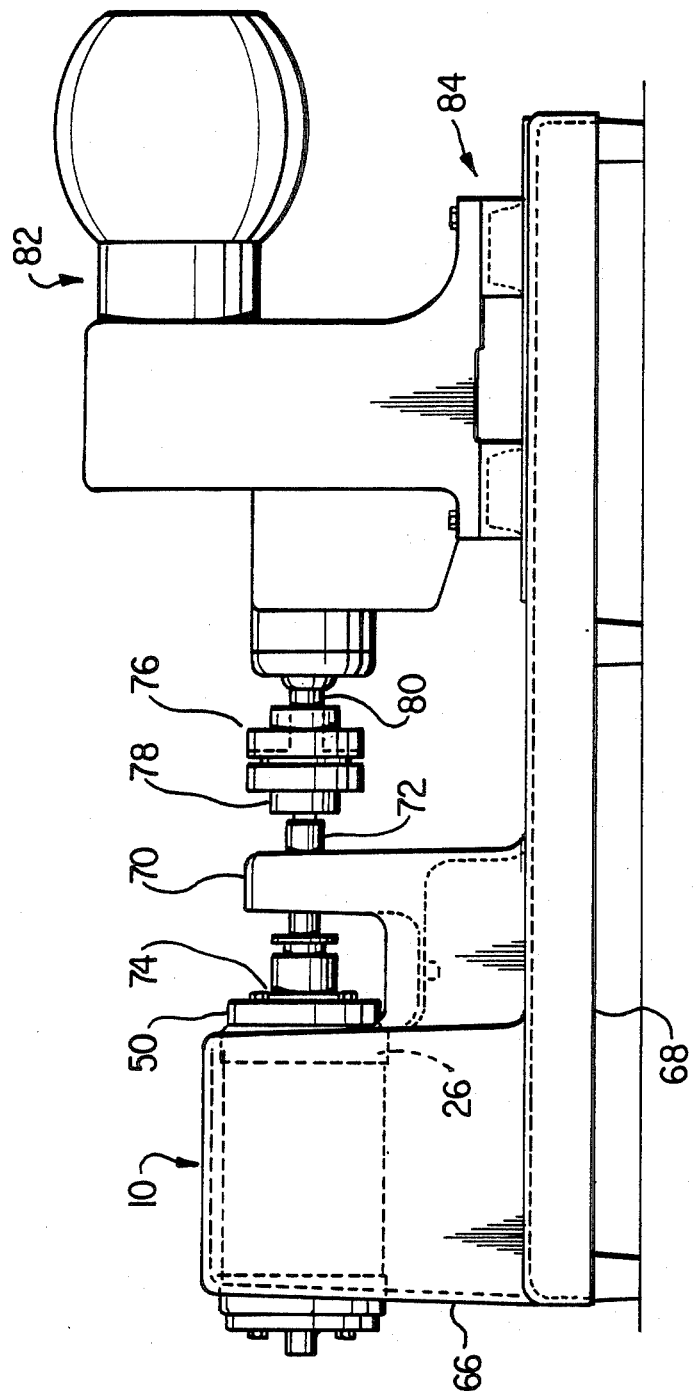

Turning to FIG. 1, the processor useful in the practice of the present invention is generally designated 10 and comprises an elongated tube 12, the ends of which are closed by closure plates 14 and 16 thereby providing a chamber 18 which constitutes a processing zone. The tube 12 is enclosed within and is co-axial with a larger elongated tube 20. The annular space between tubes 12 and 20 is converted by molding 22, which extends from the interior surface of tube 18 to the exterior surface of tube 12, into a channel 24 which extends in a helical fashion from heat exchange medium inlet 26 to heat exchange medium outlet 28.

Heat exchange medium is circulated through helical chamber 24 usually in a countercurrent manner to that of material being processed. For example, material to be processed would usually enter through radially oriented inlet port 50 and exit via axially oriented port 48, in which case heat exchange medium would enter chamber 24 via port 28 and exit via port 26.

The outer tube 20 is enclosed within a thermal insulating jacket 30 which extends the full length of tube 20 between end members 32 and 34. End members 32 and 34 which contain inlets 26 and 28, respectively, are secured at their axially inner portion by welds 36 and 38, respectively, to the outer surface of tube 20 and, to prevent heat exchange medium leaking, are provided with an "O" ring seal arrangement 40 and 42, respectively at their axially outer portions. End plate 14 is secured to end member 34 by bolts 44 and plate 16 is secured to end member 32 by bolts 46. Extending through end plate 14 is material exit port 48 and through end plate 16 material inlet port 50. The terms inlet and outlet are herein used interchangeably since, obviously, their functions could be reversed if desired. End plate 14 is formed to carry a conventional bearing assembly 52.

Extending axially through chamber 18 is a rotator 54 made of stainless steel but having fused thereon a coating of polytetra-fluorethylene. The diameter of the main body portion of rotator 54 is only slightly less than the internal diameter of tube 12 such that an annular processing zone of about 2 mm in width is provided between rotator 54 and the inner surface of tube 12. A reduced end portion 56 of rotator 54 is supported by the bearing assembly 52 (eg. bushing in a stainless steel head) carried by plate 14. A reduced end portion 58 of the rotator 54 is also supported for rotation within a conventional bearing arrangement (not shown), for example, a cylindrical cartridge type such as a FAFNIR LC MECHANI-SEAL TM type.

The extremity 60 of reduced end portion 58 is provided with a flat point socket 62. The opening 64 of chamber 18 sealed with a conventional closure plate arrangement.

Figure 2:
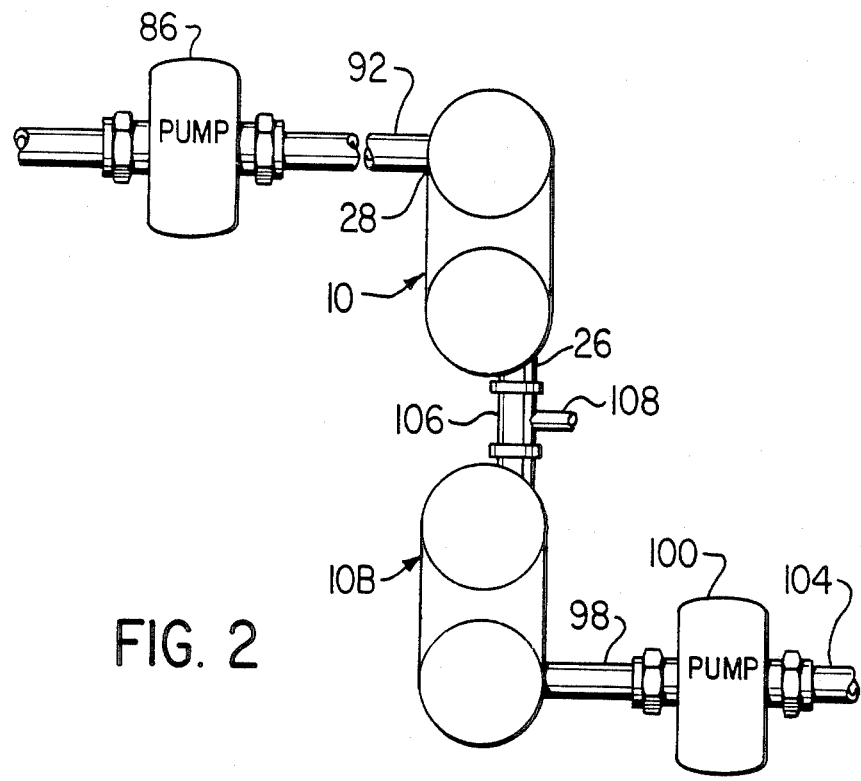
FIG. 2 is a schematic representation of the device shown in FIG. 1, coupled with various other apparatus useful in carrying out a preferred process of the present invention.
Figure 2A:
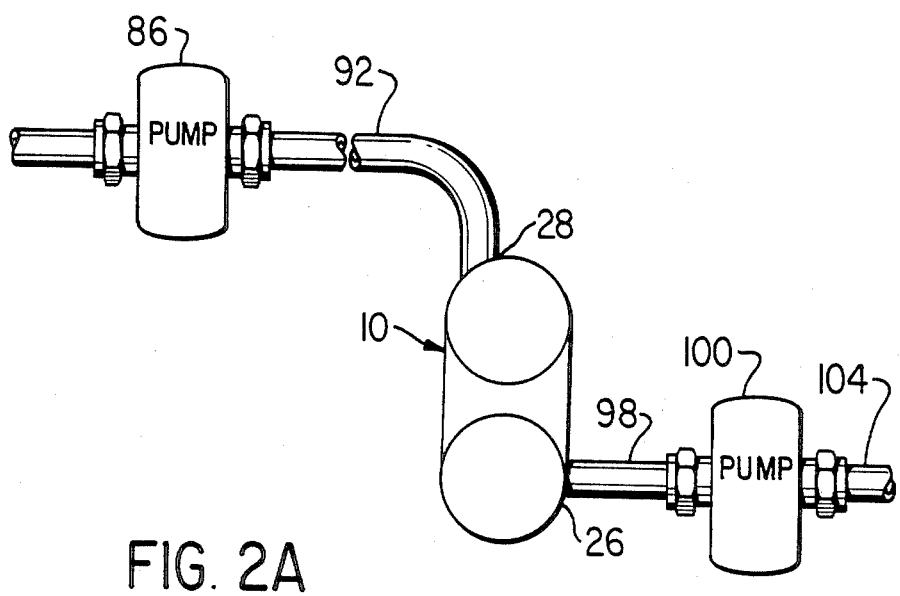
FIG. 2A is a schematic representation similar to that shown in FIG. 2, but without the scraped surface heat exchange apparatus 10B depicted in FIG. 2.

Turning now to FIG. 2, there is illustrated the food processor 10 useful in the practice of the present invention and a pump system arranged to supply whey protein concentrate to, maintain the pressure (about 80 to 90 psi being preferred) in, and extract processed material from processor 10. The pump system comprises a first pump 86 connected via conduit 92 to the inlet 28 of processor 10.

The axially oriented exit port 26 of the processor 10 is connected via conduit 106 to the equivalent axially oriented port of the conventional single blade scraped surface heat exchanger 10B. As will be clear from the drawing, that mode of connection ensures a smooth flow of material, without change of direction, through both the processor 10 and the conventional heat exchanger 10B. This ensures an even flow of product from the processor 10 to the heat exchanger 10A wherein the product is cooled as aforementioned to avoid loss of desirable volatile components. Also, by avoiding eddy currents in the flow between the processor 10 and heat exchanger 10B, none of the product remains at the elevated treatment temperature for an undesirably protracted period, which in turn assists in maintaining the uniform character of the product.

The connecting conduit 106 is provided with an insulating jacket or preferably for flexibility of operation, means to attain the passage of a heat exchange medium therearound. It is also provided with a port 108 through which temperature and pressure sensors (not shown) are located, thereby allowing careful monitoring of the states of material during processing. The exit port of the heat exchanger 10B communicates via conduit 98 with a second pump 100. Processed material exits pump 100 via conduit 104.

In operation, the fluid food, slurry or solution to be processed is supplied to pump 86 and is pumped to processor 10 via conduit 92 at a substantially constant rate.

In the meanwhile, the rotator 54 is driven at a constant speed usually in the range of 850 to 1200 rpm (typically about 1000 rpm, ie. about 500,000 min$^{-1}$). Product yield (measured as a percentage of total true protein contained in the whey protein content which is converted into macrocolloids of the present invention) is increased at higher rotator speeds, relative to lower rotator speeds. This is believed to be some sort of scavenging phenomenon. Processed material exits via port 48, passes through outlet 26 and conduit 106 to heat exchanger 10B. After cooling the material is moved through conduit 98 to pump 100 and finally, through conduit 104, to packaging equipment (not shown) if it is to be packed immediately. This arrangement and operation is very advantageous since, for example, reheating of the product to sterilize same, et cetera, need to be carried out. Alternatively, the processed material can be passed to storage. It should be noticed that pumps 86 and 100 work together in an arrangement which ensures smooth transport of material through the processor and also allows for delicate fine tuning of the pressure in the system. Obviously, upon start up, the system has to be balanced to obtain precisely the pressures, temperatures, shear applied and rate of material through put desired, those parameters obviously being mutuallly interdependent to a great extent.

Processing Aids: Aggregate Blocking Agents

The very high levels of shear useful in the practice of the present invention are believed to prevent the formation of large denatured protein aggregates during the denaturation process described hereinbefore. Broadly speaking then, the high shear force is in effect an aggregate blocking agent.

Other agents having a similar function have also been discovered. Commercial lactase preparations used in pre-processing of the WPC will act to a certain extent as an aggregate blocking agent. It is unclear whether this function derives in part from the residual proteolytic activity in the commercial enzyme preparation or whether the blocking activity derives solely from the increased number of negatively charged functional groups (hydroxyl groups) produced when the lactose dissaccharide is split into the glucose and galactose monosaccharide. In any case, the commercial lactase preparations do evince an aggregate blocking function. So also do other agents having negatively charged surfaces which interact with positively charged regions on the exterior of the whey protein molecules at pH's below the protein's isoelectric point. Thus, such positively charged regions on the whey protein molecules are not as readily available for inter-molecular interaction with negatively charged surface regions on other whey protein molecules. While such other agents may take many forms and function in a variety of ways, none are capable of replacing for the high shear requirement. Nonethless, such other agents may be used, either singly or in combination with one another, in tandem with the high shear treatments of the whey proteins to produce not only an enhanced or more uniform degree of aggregate blocking, but also to impart other characteristics to the product which are distinctive of the blocking agent(s) employed in any given case.

Chemical, as distinct from the above-mentioned enzymatic agent(s), useful in the practice of the present invention include hydrated anionic materials such as: lecithin (1% to 3% by weight of the whey protein concentrate; xanthan gum (0.01% to 0.05% by weight of the whey protein concentrate); and, less preferred datem esters (0.5% to 2.0% by weight of the whey protein concentrate—note: these esters contribute on off-flavour to the final product). The action of these agents appears to involve an interaction between their own negative charges and the residual positive charges on the whey proteins at the acid pH's used in processing in accordance with the present invention. It is noted that the effect of these anionic agents is apparently opposite to those effects which are believed to derive from the divalent, cationic materials (eg. $CA^{++}$) normally present in whey. It is contemplated, therefore, that eliminating divalent cations in the whey protein concentrate may have an aggregate blocking effect.

Maltrins are another form of a chemical aggregate blocking agent. These are malto-dextrins produced by enzymatic hydrolysis of starch molecules. The preferred concentration is from 10% to 15% by weight of the whey protein concentrate. These materials are believed to have a protein-sparing effect, as does high fructose syrup, although the latter is not as efficient as the former in this regard. It will be appreciated that these blocking agents are carbohydrates and hence are a source of calories, a factor which may mitigate against their being selected for use in certain applications (ie. in calorie-reduced foods).

Hydrated lecithin and hydrated xanthan gum are good examples of the differing effects of different blocking agents. Both impart lubricity to the mouthfeel of the final product. Lecithin, however, being a slightly less effective blocking agent, produces a slightly larger average size macrocolloid particle. Those macrocolloid particles produced with xanthan aggregrate blocking agent, however, are smaller and smoother particles. Both of the foregoing have a whitening effect on the final product in that they seem to assist in creating a more uniformly dispersed system thereby increasing the light scattering effect which is perceived as whiteness.

Combinations of aggregate blocking agents also have been found to have useful attributes. A lecithin-maltrin combination, for example, is particularly suitable for producing macrocolloids useful in low viscosity salad dressings (eg. French) and with a more reduced solids content, a coffee whitener. A combination of xanthan and lecithin aggregate blocking agents is preferred for applications such as the high viscosity salad dressings (eg. Blue Cheese or Creamy Italian), fruit puddings and confectionery gels.

It is noted that the denaturation of the whey proteins according to the practice of the present invention is carried out under acid pH conditions as specified hereinbefore. As will be readily apparent to a man skilled in the art in light of the teachings of the instant specification, the blocking agent should be either chosen or, where necessary, adjusted, such that it does not in turn alter the pH of the mixture outside of the processing specifications.

Post-Processing Homogenization:

Once the heat denaturation process is completed the product may, optionally, be subjected to a homogenization treatment. Such a treatment is desirable in the case of products which are dilute (ie. having a low protein concentration) and/or neutralized, such as coffee whiteners for example. This treatment is useful in disrupting the relatively loose, intra-particle associations which occasionally form during processing. While not aggregated (ie. not fused into particles of substantially larger than 2 microns in diameter) those of the macrocolloids which are associated with one another (ie. usually in doublets or triplets) are nonetheless organoleptically perceived as a single composite particles which cannot be differentiated from aggregates on the basis of their respective mouth feels. The homogenization treatment disrupts these associations of particles into individual macrocolloids having the desired mouth feel attributes. While any of the traditional homogenization treatments known in the art may be employed to this end, reasonable care must be taken to avoid exposing the macrocolloids to such elevated temperatures as may cause them to aggregate to larger particles.

The homogenization treatment in dilute products having low macrocolloid concentrations (eg. coffee whiteners) is preferably carried out at about a pH of 6 to 7. At such pH's the distribution of electrical charges on the surfaces of the macrocolloids helps maintain an even dispersion of the macrocolloids in the aqueous medium.

Particle Size Testing:

Particle size testing provides a measure of organoleptic quality of the products of the present invention.

One of the simplest and most rapid of the techniques available to a man skilled in the art involves the preparation of an optical slide in a manner which is analogous to the preparation of clinical blood smears. Pursuant to this method, an appropriate dilution of the dispersed macrocolloid is first prepared and adjusted to a pH preferably in the range of 6.5 to 7. High speed magnetic stirring, ultrasonication or homogenization is then applied to fully disperse any weak associations there might be between the individual macrocolloid particles. A small amount (eg. 8 microliters) of the diluted, neutralized dispersion is then applied to a glass microscope slide of the variety often used in biological studies, and allowed to dry. The sample is viewed under known magnification using "ruled" occular eyepieces with well-known methods. The dispersed macrocolloidal particles of the sample was then visually compared with the reticules on the occular to provide a good estimation of the statistical incidence of oversize or aggregated particles within the population as a whole.

An alternative means for analyzing particle size distributions involves the use an image analyzing computer, for example, a QUANTIMET ™ 720 available from Cambridge Institute, U.K.

Another means involves the use of the MICROTRAC ™ particle size analyzer. The general aspects of this technique are described in an article entitled "Particle Size Analysis and Characterization Using Laser Light Scattering Applications" by J. W. Stitley, et al in *Food Product Development,* December 1976.

As will be apparent to a man skilled in the art in light of the instant disclosure, sedimentation techniques may also be utilized for the purpose of rendering particle size determinations. It will be appreciated, however, that gravimetric techniques must take into account the protective colloid effects of, for example, whatever processing aids may have been used during the above-described heat denaturation treatment. One example of a gravimetric determination of the percent "oversized" whey protein aggregate is summarized hereinbelow:

1. A 5% weight by weight dispersion of the macrocolloid of the present invention is prepared and neutralized to a pH of between 6.5 and 7;
2. A high fructose corn syrup having a specific gravity of 1.351, a pH of 3.3, a total nitrogen of 0.006% and a solids concentration of about 71% is added in a 1 to 4 weight by weight ratio to the neutralized 5% macrocolloid dispersion;
3. The mixture is then homogenized to disperse loose associations between the macrocolloid particles;
4. The mixture is then centrifuged at 478 gravities for 20 minutes at about 15 degrees Centigrade. The oversized whey protein aggregates, ie. particles having a diameter substantially greater than 2 microns, can be expressed as a percentage of the weight of the protein contained in the centrifuged pellet divided by the weight of the protein contained in the macrocolloidal dispersion prior to centrifugation.

These tests are applicable in respect of both the macrocolloidal dispersions of the present invention and the whey protein concentrates useful as raw materials in the production of said macrocolloids. As will be readily apparent to a man skilled in the art, capacitence based particle size analysis equipment such as, for example, the well known Coulter-Counter TM analysers will not be suited to the present application, having regard to the charged nature of themacrocolloid particles at certain pH's.

EXAMPLE 1

A mixture was prepared comprising 41% by weight of a whey protein concentrate obtained from Express Foods and 44% water at 65 degrees Centigrade. The mixture was acidified to a pH of 4.2 by way of the addition of a food-grade acid to the over all mixture. 30,000 units of a commercial fungal-lactase was added to the mixture and the pH was again checked to ensure that it remained at 4.2. 3% by weight of lecithin was added and the mixture was deaerated in a Versator TM running at 3.7 kilograms per minute, then permitted to stand overnight. The mixture had a specific gravity of 1.16. After standing, the mixture was then passed to a fluid processing device substantially as described hereinbelow in relation to FIG. 1 and arranged generally as shown in FIG. 2. The fluid processing device was operated under steady-state conditions wherein the rotor was run at about 900 rpm, the temperature of the heat transfer medium, steam in this case, was about 120 degrees Centigrade at the inlet and about 117 degrees Centigrade at the outlet. The mixture was maintained at about 80 to 90 psi during heating to prevent out-gassing of liquids which would otherwise boil at such temperatures under ambient atmospheric pressures. Four different residence times were utilized in the fluid treatment device such that the product was raised to four corresponding treatment temperatures as set out in Table 1 below.

TABLE 1

| Res. Time | Treat. Temp. (degrees Centigrade) |
|---|---|
| 3.7 sec | 80 |
| 5.5 sec | 100 |
| 6.5 sec | 107 |
| 7.5 sec | 112 |

The product was cooled in a single blade, scraped heat exchange apparatus operating agt about 200 rpm, to about 80 degrees Centigrade or less, having due regard for the heat labile nature of the product in the absence of high shear forces, as has already been disclosed elsewhere herein. Each of the four samples of the macrocolloid product so produced were adjudged to be organoleptically satisfactory insofar as their emulsion-like character was concerned. Of course, it will be understood that the extent of conversion (ie. yield) of macrocolloid particles was lower at the shorter residence times/lower temperatures than under the longer time/higher temperature treatments.

EXAMPLE 2

A macrocolloid product was produced generally in accordance with the procedure outlined about in Example 1, wherein the whey protein concentrate was introduced to the fluid processing device at about 19 degrees Centigrade (ambient) and raised to a treatment temperature of about 112 degrees Centigrade (at 80 to 90 psi) over about a 7.5 second residence time. The resulting macrocolloid was admixed with additional ingredients as set out in Table 2 below:

TABLE 2

| macrocolloid product | 69.8 (% by weight) |
|---|---|
| white vinegar | 8.6 |
| cider vinegar | 6.9 |
| sugar | 6.4 |
| high-fructose corn syrup | 5.5 |
| salt | 1.8 |
| pureed onion | 0.8 |
| mustard | 0.09 |
| white pepper | 0.013 |
| garlic powder | 0.013 |

This mixture was supplemented further with low concentrations of corn and pimento oils solubilized in ethanol. The resulting admixture was a very acceptable mayonnaise-like product having virtually no fat content. A very wide variety of flavours were found to be possible using solutions of such oils, singly or in blends, without introducing large quantities of fats into the final product.

EXAMPLE 3

Another sample of a whey protein concentrate, similar to that used in Example 1, was admixed with the ingredients and in the proportions set out in Table 3 below:

TABLE 3

| WPC | 28.7 (% by weight) |
|---|---|
| tap water | 29.52 |
| *acid mix HCL/citric | 8.4 |
| lecithin | 3.0 |
| white vinegar | 8.6 |
| cider vinegar | 6.9 |
| pureed onion | 0.8 |
| mustard | 0.15 |
| white pepper | 0.013 |
| garlic powder | 0.013 |
| xanthan gum | 0.1 |
| locust bean gum | 0.1 |
| These ingredients were hydrated, mixed and then the balance of the ingredients, as follows, were added: | |
| sugar | 6.4 |
| HFCS | 5.5 |
| salt | 1.8 |

The mixture was then deaerated under vacuum in a Versator TM deaerator and passed directly, and at ambient temperatures, to the apparatus illustrated in FIGS. 1 and 2 of the drawings hereunto appended.

The mixture was heated to 112 degrees Centigrade to 113 degrees Centigrade to produce a first sample and, by increasing the residence time, to about 114 degrees Centigrade to 115 degrees Centigrade to produce a second sample of product. Heating was carried out at 80 to 90 psi in both cases. These products were then passed to the scraped, single blade heat exchanger wherein they were cooled to about 80 degrees Centigrade and immediately bottled.

The products so produced were in both cases mayonnaise-type products having the desired emulsion-like character and a pleasant flavour. This example is illustrative of an embodiment of the present invention wherein lactose hydrolysis is not employed. The relatively low concentration of the whey protein concentrate contained in the over all mixture was such that the lactose concentration did not result in the formation of undesirable lactose crystals in the final product.

EXAMPLE 4

Table 4, set out hereinbelow, represents a comparison of the fat, protein, carbohydrate, cholesterol and caloric contents of several commercial food dressings with two mayonnaise-like products that were produced in accordance with the practice of the present invention and, more particularly, were produced in a manner similar to that set out in Example 3. The second of the two representative products of the present invention is a "sugar-free" variation in that sugar and high fructose corn syrup were omitted from the product formulation. These sugars were replaced by Aspartame in an amount sufficient to compensate for the loss of sweetness.

TABLE 4

| Product | Composition (%) | | | Cholesterol (mg/100 g) | Calories (Kcal/100 g) |
|---|---|---|---|---|---|
| | Fat | Protein | Carbohydrate | | |
| mayonnaise | 78.6 | 1.1 | 2.7 | 71.4 | 716.8 |
| Miracle Whip TM Salad Dressing | 33.4 | 0.9 | 23.9 | 53.3 | 389.7 |
| Calorie-Wise TM Mayonnaise | 32 | 0.8 | 5.3 | 52.0 | 312.0 |
| Weight-Watchers TM Salad Dressing | 13.3 | 0.3 | 15.0 | 31.4 | 181.0 |
| Macrocolloid-based, mayonnaise-like product | 2 | 14.4 | 22.4 | 0 | 162.5 |
| Macrocolloid-based "sugar-free" mayonnaise-like product | 2 | 14.4 | 11.6 | 0 | 120.8 |

EXAMPLE 4A

The present invention also provides thicker products, eg. sandwich spreads such as those of the NUTELLA TM type which is a sweet, hazel nut-chocolate sandwich spread. A similar product to NUTELLA TM and having the same nutty taste and smooth spreadable character was produced, the proteinaceous base being suitably flavoured and sweetened with ASPERTAME TM sweetener.

EXAMPLE 5

A 100 kilogram batch of a mayonnaise-like product was prepared in accordance with the practice of the present invention by admixing the following ingredients:

TABLE 5

| Whey protein concentrate | 28.7 | (percent by weight) |
|---|---|---|
| Tap water | 29.7 | |
| *Food grade acid mixture | 8.4 | |
| White vinegar | 8.6 | |
| Cider vinegar | 6.9 | |
| Lecithin | 3.0 | |
| Sugar | 6.4 | |
| High fructose corn syrup | 5.5 | |
| Salt | 1.8 | |
| Pureed onion | 0.8 | |
| White pepper | 0.013 | |
| Garlic powder | 0.013 | |
| Mustard | 0.15 | |

*The pH of the food grade acid mixture was selected such that the pH of the total mixture was about 4 at 20 degrees Centigrade.

The resulting mixture had a specific gravity of about 1.199. The mixture was dearated and passed to the fluid processing device illustrated in FIG. 1 and described in detail elsewhere herein. The rotor speed of the processing device was set at about 500 rpm and the mixture was fed through the processing chamber at a rate of 530 grams per minute. The temperature of the mixture was raised to about 116 degrees Centigrade (at 80 to 90 psi) and the resulting product was cooled, depressurized and then collected as it exited the processing apparatus.

Photomicrographs shown in FIGS. 3 through 7 were obtained by scanning electron microscopy.

FIG. 3a is a photomicrograph depicting a diluted, dispersed sample of this product at 400× magnification.

FIG. 3b is a photomicrograph of a portion of the field shown in FIG. 3a, at 5000× magnification and depicts a particularly large macrocolloidal particle together with a predominance of particles in the preferred size range of the present invention.

FIGS. 4a, 4b, 5a and 5b are likewise pairs of photomicrographs of macrocolloids of the present invention although slightly different processing conditions were used to produce the samples used in the FIGS. 4a and 4b and the FIGS. 5a and 5b.

FIGS. 3, 4 and 5 are paired photographs (a) and (b) respectively, wherein the large particle shown in the (b) series is shown in the (a) series at lower magnification, roughly in the centre of the (a) series.

Reference is made now for comparative purposes to FIGS. 6a and 6b of the drawings. These photomicrographs depict a typical sample of ALATAL®810 whey protein. This protein material is a commercially available product which is similar to the "about 28 micron" material disclosed by J. L. Short in the *New Zealand Journal of Dairy Science and Technology*, 15, 167–176. ALATAL®810 whey proteins are prepared by heat precipitating pure whey protein sedimenting the flocculated curd thus formed and washing, filtering, drying and grinding the resulting product. The product is described in literature distributed by New Zealand Milk Products, Inc. as being insoluble in water and alcohol and having excellent dispersibility, low functionality, moderate to low water absorption and mild abrasive characteristics. The same product literature indicates that 99% of this whey protein passes through 40 mesh screens.

A typical sample of ALATAL®812 whey protein is depicted n the photomicrographs shown in FIGS. 7a and 7b at 40× and 400× magnification, respectively. These products are generally used as additives for cereal grains such as corn meal, wheat flour or white rice, for example. They are also used as protein extenders in dietetic and infant foods.

A visual comparison of FIG. 6b or 7b with FIGS. 3a, 4a or 5a permits a qualitative evaluation of the differences between the particle size distributions of presently available commercial whey protein products with the whey protein macrocolloids of the present invention. Qualitative comparison is made possible by way of particle size distribution analysis software. The relevant methodology and apparatus are discussed below.

A mechanically mixed, dilute, aqueous suspension or dispersion of a sample of the particles of interest is further dispersed using a ultrasonicator. A small volume of the well-dispersed suspension is then applied to the surface of an optical microscope slide and smeared in a manner analogous to that in which a clinical blood smear is made, such that a thin, evenly distributed film coats a significant portion of the slide. The slide was then viewed under a (Ziess) Photomicroscope and a field of view being randomly selected. The image of that field is then projected onto the video tube of a DAGE® Mode1NC67M video camera available from Dage MIT Inc., Michigan City, Ind. The camera controls are adjusted to achieve maximum contrast on a video monitor and then the electronic image as perceived by the camera is digitized using the DAPPLE SYSTEMS IMAGE PLUS DATA ACQUISITION™ software (available from Dapple Systems Inc., California) and an APPLEIIE™ computer. This procedure is then repeated for a statistically suitable number of additional fields of view. A statistically valid sampling is usually constituted from the data after viewing 200 or more particles.

The amassed data represents the area in square microns of each particle that was viewed. This data is then mathematically transformed to produce measures of equivalent diameter and equivalent volume. These transformations are conveniently carried out in the computer using the DAPPLE SYSTEMS IMAGE PLUS STATISTICAL ANALYSIS™ Software. A distribution pattern can then be calculated using a logrithmic scale for a base line to plot semi-logrithmic histograms of the original sample's particle size distribution base on either the equivalent diameter or equivalent volume transformations mentioned above. The base line may also be linear, an option which is useful in those circumferences in which the absolute range between smallest and largest particles is relatively small.

FIG. 8a depicts a semi-logrithmic histogram showing particle size distributions based on equivalent volume transformations obtained in accordance with the foregoing procedure for ALATAL®810 whey protein.

FIG. 8b depicts a rigorously comparable histogram showing the particle size distribution for the macrocolloid of the present invention (the sample is the same as that which was photographed for FIGS. 3a and 3b). FIGS. 9a and 9b afford a similar comparison of the same two materials based on equivalent diameter.

Tables 6 and 7 below provide an opportunity to compare the statistical properties of the same two whey-protein materials based on, respectively, their equivalent volumes and their equivalent diameter.

TABLE 6

(statistics based on particle size distributions derived from equivalent diameter transformations)

| Sample Size | Macrocolloids from FIG. 3a 237 | R ALATAL810 whey proteins 252 |
|---|---|---|
| mean value | .658091784 microns | 3.72706446 microns |
| variance | .11824347 | 52.3957137 |
| std. dev'n | .343865483 | 7.23848836 |
| pop'n s.d. | .344593241 | 7.25289333 |
| skew coeff. | 1.47936609 | 4.67235898 |
| kurtosis | 5.59179915 | 25.580251 |
| limits (min) | .202689664 microns | .202689664 microns |
| limits (max) | 2.19398493 microns | 50.0366589 microns |

TABLE 7

(statistics based on particle size distributions derived from equivalent volume transformations)

| Sample Size | Macrocolloids from FIG. 3a 237 | R ALATAL810 whey proteins 252 |
|---|---|---|
| mean value | .305997371 (cubic microns) | 1283.39828 |
| variance | .385952825 | 54503713.7 |
| std. dev'n | .621251016 | 7382.66305 |
| skew coeff. | 4.95179105 | 6.78055025 |
| kurtosis | 33.8675672 | 51.6650783 |
| limits (min) | 4.43502395 (cubic microns) | 4.43502395 |
| limits (max) | 5.62473522 (cubic microns) | 66721.5414 |

EXAMPLE 6

30 kilograms of a mayonnaise-like product of the present invention was prepared by first admixing in a blender the ingredients set out below in Table 8.

TABLE 8

| whey protein concentrate | 28.7 (% by weight) |
|---|---|
| tap water | 29.73 |
| food grade acid mixture | 8.4 |
| white vinegar | 8.6 |
| cider vinegar | 6.9 |
| lecithin | 3.0 |
| sugar | 6.4 |
| high fructose corn syrup | 5.5 |
| salt | 1.8 |
| pureed onion | 0.8 |
| mustard | 0.15 |
| white pepper | 0.013 |
| garlic powder | 0.013 |

The pH of the acid mixture was selected such that the pH of the total admixture was about 4 to 20 degrees Centigrade. The admixture had a specific gravity of about 1.18.

The admixture was then treated in a single pass through the previously described fluid treatment apparatus, and the temperature of the admixture was raised to about 115 degrees Centigrade under high shear conditions at about 80 to 90 psi.

A sample of the resulting product was prepared for quantitative particle size analysis in accordance with the methodology set forth in Example 5.

FIGS. 10a and 10b are histograms (having linear base lines) depicting particle distributions based on equivalent diameter and equivalent volume, respectively, of the above-mentioned sample. The product associated with this particle size distribution was judged to be especially smooth, creamy and thick.

I claim:

1. Proteinaceous, water-dispersible, macrocolloid particles comprising substantially non-aggregated particles of denatured dairy whey protein having in a dry state mean diameter particle size distribution ranging from about 0.1 microns to about 2.0 microns, with less than about 2 percent of the total number of particles exceeding 3.0 microns in diameter, and wherein the majority of the said particles are substantially spheroidal as viewed at about 800 power magnification under a standard light microscope; the particles in a hydrated state forming a macrocolloid having a substantially smooth, emulsion-like organoleptic character.

2. A hydrated proteinaceous, water-dispersible, macrocolloid particles comprising substantially non-aggregated particles of denatured dairy whey protein having in a dry state a mean diameter particle size distribution ranging from about 0.1 microns to about 2.0 microns, with less than about 2 percent of the total number of particles exceeding 3.0 microns in diameter, and wherein the majority of the said particles are substantially spheroidal as viewed at about 800 power magnification under a standard light microscope, whereby the hydrated particles have a substantially smooth, emulsion-like organoleptic character.

3. An aqueous dispersion comprising a macrocolloid of substantially non-aggregated particles of denatured dairy whey protein having in a dry state a mean diameter particle size distribution ranging from about 0.1 microns to about 2.0 microns, with less than about 2 percent of the total number of particles exceeding 3.0 microns in diameter, and wherein the majority of the said particles are substantially spheroidal as viewed at about 800 power magnification under a standard light microscope, whereby the particles in said aqueous dispersion form a macrocolloid having a substantially smooth, emulsion-like organoleptic character.

4. The dispersion of claim 3, wherein said particles are obtained from sweet dairy whey protein concentrate.

5. The dispersion of claim 4 wherein said particles of denatured dairy whey protein are produced from a sweet dairy whey protein concentrate wherein:
   (a) the pH is in the range of from about 6 to 7;
   (b) the ash, total lipids and total nitrogen, on a dry weight basis are, respectively, less than about 5 percent, between about 2 and 4 percent, and about 8.0 to 8.5 percent;
   (c) the non-protein nitrogen is less than about 0.75 percent on a dry weight basis;
   (d) the true protein is between about 45 to 55 percent on a dry weight basis; and
   (e) the insoluble and the denatured protein on a percent dry weight basis of the true protein are, respectively, 3 or less and 5 or less percent.

6. The dispersion of claim 5 wherein said sweet dairy whey protein concentrate is a substantially undenatured whey protein concentrate.

7. A proteinaceous, water-dispersible macrocolloid comprising substantially non-aggregated particles of denatured dairy whey protein where substantially the total combined mass of said particles in a dry state is made up of particles having volumes of about $5 \times 10^{-4}$ cubic microns to about 5.5 cubic microns, and wherein the majority of the said particles are substantially spheroidal as viewed at 800 power magnification under a standard light microscope; the particles in a hydrated state have a substantially smooth, emulsion-like organoleptic character.

8. The macrocolloid of claim 7 wherein said volumes do not exceed 4.2 cubic microns.

9. The macrocolloid of claim 8 wherein said particles are hydrated.

10. An aqueous dispersion of the macrocolloid of claim 8.

11. The macrocolloid of claim 7 wherein said particles are obtained from sweet dairy whey protein concentrate.

12. The dispersion of claim 11 wherein said particles of denatured dairy whey protein are produced from a sweet dairy whey protein concentrate wherein:
   (a) the pH is in the range of from about 6 to 7;
   (b) the ash, total lipids and total nitrogen, on a dry weight basis are, respectively, less than about 5 percent, between about 2 and 4 percent, and about 8.0 to 8.5 percent;
   (c) the non-protein nitrogen is less than about 0.75 percent on a dry weight basis;
   (d) the true protein is between about 45 and 55 percent; and
   (e) the insoluble and the denatured protein on a percent dry weight basis of the true protein are, respectively, 3 or less and 5 or less percent.

13. The dispersion of claim 12 wherein said sweet dairy whey protein concentrate is a substantially undenatured, whey protein concentrate.

14. A process comprising heating undenatured dairy whey proteins at heat denaturing temperatures in an aqueous solution at a pH within the lower half of the isoelectric curve of said proteins under shear conditions selected so as to avoid the formation of any substantial amounts of fused particulate proteinaceous aggregates having diameters in excess of about 2 microns while at the same time forming denatured proteinaceous macrocolloidal particles which are greater than about 0.1 microns in mean diameter in a dry state.

15. The process according to claim 14 wherein said undenatured dairy whey proteins are sweet dairy whey proteins.

16. The process according to claim 15 wherein said pH is between about 3.5 and 5.0.

17. The process according to claim 14 wherein said heat denaturation is carried out at temperatures of between 80 degrees Centigrade and 130 degrees Centigrade.

18. The process of claim 14 wherein said aqueous solution is deaerated prior to heat denaturing said proteins.

19. The product of the process according to claim 14.

20. A process for heat denaturing undenatured dairy whey proteins comprising the steps of heating said proteins in aqueous solution at a temperature of between about 80 degrees Centigrade and 130 degrees Centigrade and at a pH in the range of between about 3.5 and 5.0, under shear conditions selected so as to avoid the formation of any substantial amounts of fused particulate proteinaceous aggregates having diameters in excess of about 2 microns, said process being carried out for a time sufficient to produce a substantial amount of denatured, proteinaceous macrocolloidal particles of between about 0.1 and 2 microns in mean diameter in a dry state.

21. The process according to claim 20 wherein said undenatured dairy whey proteins are sweet dairy whey proteins.

22. The process according to claim 21 wherein said temperature is between about 90 degrees Centigrade and 120 degrees Centigrade.

23. The process according to claim 21 wherein said pH is between about 3.5 and 4.5.

24. The process according to claim 23 wherein said pH is between about 3.7 and 4.2.

25. The process according to claim 21 wherein said shear is about 500,000 reciprocal minutes.

26. The process according to claim 21 wherein said time is between about 15 minutes to about 3 seconds.

27. The process of claim 20 wherein said aqueous solution is deaerated prior to heat denaturing said proteins.

28. The product of the process according to claim 20.

29. A process for heat denaturing undenatured sweet dairy whey proteins comprising the steps of heating said proteins in solution at a temperature of between about 90 degrees Centigrade to 120 degrees Centigrade and at a pH in the range of about 3.7 to 4.2, and at about 450,000 to 600,000 reciprocal minutes of shear for between about 5 minutes to about 3 seconds.

30. The process of claim 20 wherein said shear is about 500,000 reciprocal minutes.

31. A process for treating dairy whey comprising the steps of: concentrating the dairy whey to form an aqueous solution having reduced concentrations, on a percent by dry weight of total solids basis, of lactose and minerals and wherein the undenatured dairy whey protein concentration exceeds about 35 percent on a dry basis, by weight of the total solids; and the final concentration of lactose on a fully-diluted basis in the solution at the time of a subsequent denaturation treatment does not exceed 17 percent by weight of that solution; and heating to effect denaturing of said undenatured dairy whey proteins in said solution at a pH within the lower half of the isoelectric curve of said proteins under shear conditions selected so as to avoid the formation of any substantial amounts of fused particulate proteinaceous aggregates having diameters in excess of about 2 microns while at the same time forming denatured proteinaceous macrocolloidal particles which are greater than about 0.1 microns in mean diameter.

32. The process of claim 31 wherein said aqueous solution is deaerated prior to heat denaturing said proteins.

33. The process of claim 31 wherein the undenatured dairy whey protein concentration does not exceed about 55 percent on a dry basis, by weight of the total solids in said solution.

34. The process of claim 33 wherein the undenatured dairy whey protein concentration is about 48 percent on a dry basis by weight of the total solids in said solution.

35. The process according to claim 31 wherein said dairy whey is concentrated to a solution having a total solids concentration of from about 40 percent to 50 percent by weight.

36. The process according to claim 31 wherein said dairy whey is sweet dairy whey.

37. The process according to claim 31 wherein prior to heat denaturing, the whey protein in said solution is an undenatured whey protein concentrate.

38. The process according to claim 37 wherein the concentrated whey protein is based on sweet dairy whey and meets the following specification:
 (a) the pH is in the range of from about 6 to 7;
 (b) the ash, total lipids and total nitrogen, on a dry weight basis are, respectively, less than about 5 percent, between about 2 and 4 percent, and about 8.0 to 8.5 percent;
 (c) the non-protein nitrogen is less than about 0.75 percent on a dry weight basis;
 (d) the true protein is between about 45 and 55 percent on a dry weight basis; and
 (e) the insoluble and denatured protein, on a percent dry weight basis of the true protein are, respectively, 5 or less and 3 or less percent.

39. The process according to claim 37 wherein said sweet dairy whey is pasteurized sweet dairy whey.

40. The process according to claim 31 wherein said concentrating of the dairy whey is accomplished by way of ultra-filtration.

41. The process according to claim 40 wherein said ultra-filtration is carried out using an ultra-filter having a molecular weight cut-off in the range of between 20,000 to 30,000 daltons.

42. The process according to claim 40 wherein the concentration of said solution is further adjusted under substantially non-protein denaturing conditions following said ultra-filtration, to between about 40 percent to percent by weight of said solution.

43. The process according to claim 42 wherein said concentration is carried out using a technique selected from the group consisting of: freeze-drying the solution and then rehydrating to the desired total solids concentration; and evaporating excess water under reduced pressure so as to substantially avoid protein denaturing conditions, until the desired total solids concentration is realized.

44. The process according to claim 40 wherein said lactose concentration is at least partially reduced, following ultra-filtration, by way of enzymatic lactose hydrolysis.

45. The process according to claim 31 wherein said heat denaturing of undenatured dairy whey proteins includes the steps of heat denaturing said proteins at a temperature of between about 90 degrees Centigrade to 120 degrees Centigrade at a pH in the range of about 3.7 to 4.2, under about 450,000 to 600,000 reciprocal minutes of shear for between about 5 minutes to about 3 seconds.

46. The process according to claim 45 wherein said undenatured dairy whey solution is deaerated prior to heat denaturing.

47. The process according to claim 45 wherein said shear is 500,000 reciprocal minutes.

48. The product of the process according to claim 31.

49. In an edible food product containing fats in concentration sufficient to make an organoleptic contribution to said product, the improvement comprising replacing at least a portion of said fats by a hydrated proteinaceous macrocolloid comprising substantially non-aggregated particles of denatured dairy whey protein having mean diameter particle size distributions, in a dry state ranging from about 0.1 microns to about 2.0 microns, with less than about 2 percent of the total number of particles exceeding 3.0 microns in diameters, and wherein the majority of the said particles are spheroidal as viewed at about 800 power magnification under a standard light microscope, whereby the hydrated particles contribute a substantially smooth, emulsion-like organoleptic character to said product.

50. The product of claim 49 wherein substantially all of said fat has been replaced by said hydrated macrocolloid.

51. The product of claim 49 wherein said product is a pourable salad dressing.

52. The product of claim 49 wherein said product is a mayonnaise-type spread.

53. The product of claim 52 wherein about 70% by weight of said product is said macrocolloid.

54. The product of claim 53 wherein said product is a sugar-reduced product including an artificial sweetener in an amount sufficient to organoleptically balance the reduced amount of sugar contained in said product.

* * * * *